United States Patent
Kadnikov et al.

(10) Patent No.: US 9,393,846 B2
(45) Date of Patent: Jul. 19, 2016

(54) TRAILER COUPLING

(71) Applicants: Aleksej Kadnikov, Leonberg (DE);
Bernhard Rimmelspacher, Rheinstetten (DE); Wolfgang Gentner, Steinheim (DE)

(72) Inventors: Aleksej Kadnikov, Leonberg (DE);
Bernhard Rimmelspacher, Rheinstetten (DE); Wolfgang Gentner, Steinheim (DE)

(73) Assignee: Scambia Holdings Cyprus Limited, Limassol (CY)

( * ) Notice: Subject to any disclaimer, the term of this patent is extended or adjusted under 35 U.S.C. 154(b) by 223 days.

(21) Appl. No.: 13/919,359

(22) Filed: Jun. 17, 2013

(65) Prior Publication Data

US 2013/0341888 A1 Dec. 26, 2013

(30) Foreign Application Priority Data

Jun. 19, 2012 (DE) .......................... 10 2012 105 316

(51) Int. Cl.
| | |
|---|---|
| *B60D 1/06* | (2006.01) |
| *B60D 1/58* | (2006.01) |
| *B60D 1/62* | (2006.01) |
| *B60D 1/24* | (2006.01) |

(52) U.S. Cl.
CPC .. *B60D 1/58* (2013.01); *B60D 1/06* (2013.01); *B60D 1/62* (2013.01); *B60D 1/24* (2013.01)

(58) Field of Classification Search
CPC .............. B60D 1/00; B60D 1/06; B60D 1/24; B60D 1/36; B60D 1/248
USPC ........ 280/477, 511, 432, 446.1, 492; 340/431
See application file for complete search history.

(56) References Cited

U.S. PATENT DOCUMENTS

| | | | | |
|---|---|---|---|---|
| 5,191,328 A | * | 3/1993 | Nelson ..................... | B60D 1/36 250/491.1 |
| 5,712,478 A | * | 1/1998 | Olsson .................... | G01B 7/004 250/231.13 |
| 6,995,687 B2 | * | 2/2006 | Lang ........................ | B60R 1/00 340/431 |
| 7,036,233 B1 | * | 5/2006 | Schindler ................. | G01D 5/00 33/1 PT |
| 7,159,890 B2 | * | 1/2007 | Craig ....................... | B60D 1/58 280/432 |
| 7,648,153 B2 | * | 1/2010 | Metternich ............ | B62D 15/02 280/433 |

(Continued)

FOREIGN PATENT DOCUMENTS

| | | |
|---|---|---|
| CN | 1839057 A | 9/2006 |
| CN | 101628594 A | 1/2010 |
| DE | 19810378 A1 | 9/1999 |
| DE | 102010011741 A1 | 9/2011 |

(Continued)

*Primary Examiner* — Anne Marie Boehler
(74) *Attorney, Agent, or Firm* — Reinhart Boerner Van Deuren P.C.

(57) ABSTRACT

The invention relates to a trailer coupling for motor vehicles, comprising a coupling ball carrier which can be mounted on a vehicle body and a coupling ball with a ball body which has a ball surface extending between a ball attachment and an upper end surface of the ball body, with which the ball surface comprises a sensor zone for recognizing a body located close to or on the coupling ball, several detection locations different from one another are located in the sensor zone, a sensor unit arranged stationarily in the ball body beneath the ball surface is associated with each detection location and each sensor unit is designed such that it detects a body present in a close-proximity area above the ball surface at the respective detection location.

29 Claims, 21 Drawing Sheets

(56) References Cited

U.S. PATENT DOCUMENTS

| | | | |
|---|---|---|---|
| 8,191,915 B2 * | 6/2012 | Freese | B60D 1/36 180/167 |
| 8,393,632 B2 * | 3/2013 | Vortmeyer | B60D 1/06 280/504 |
| 2004/0100357 A1 * | 5/2004 | Kruse | B60G 7/005 338/128 |
| 2015/0035256 A1 | 2/2015 | Klank et al. | |

FOREIGN PATENT DOCUMENTS

| | | |
|---|---|---|
| DE | 102010033641 A1 | 2/2012 |
| DE | 202011005144 U1 | 2/2012 |
| EP | 1160105 A2 | 12/2001 |
| EP | 2316668 A1 | 5/2011 |
| EP | 2366563 A2 | 9/2011 |
| WO | WO 2007/093069 A1 | 8/2007 |
| WO | WO 2013/156217 A1 | 10/2013 |

* cited by examiner

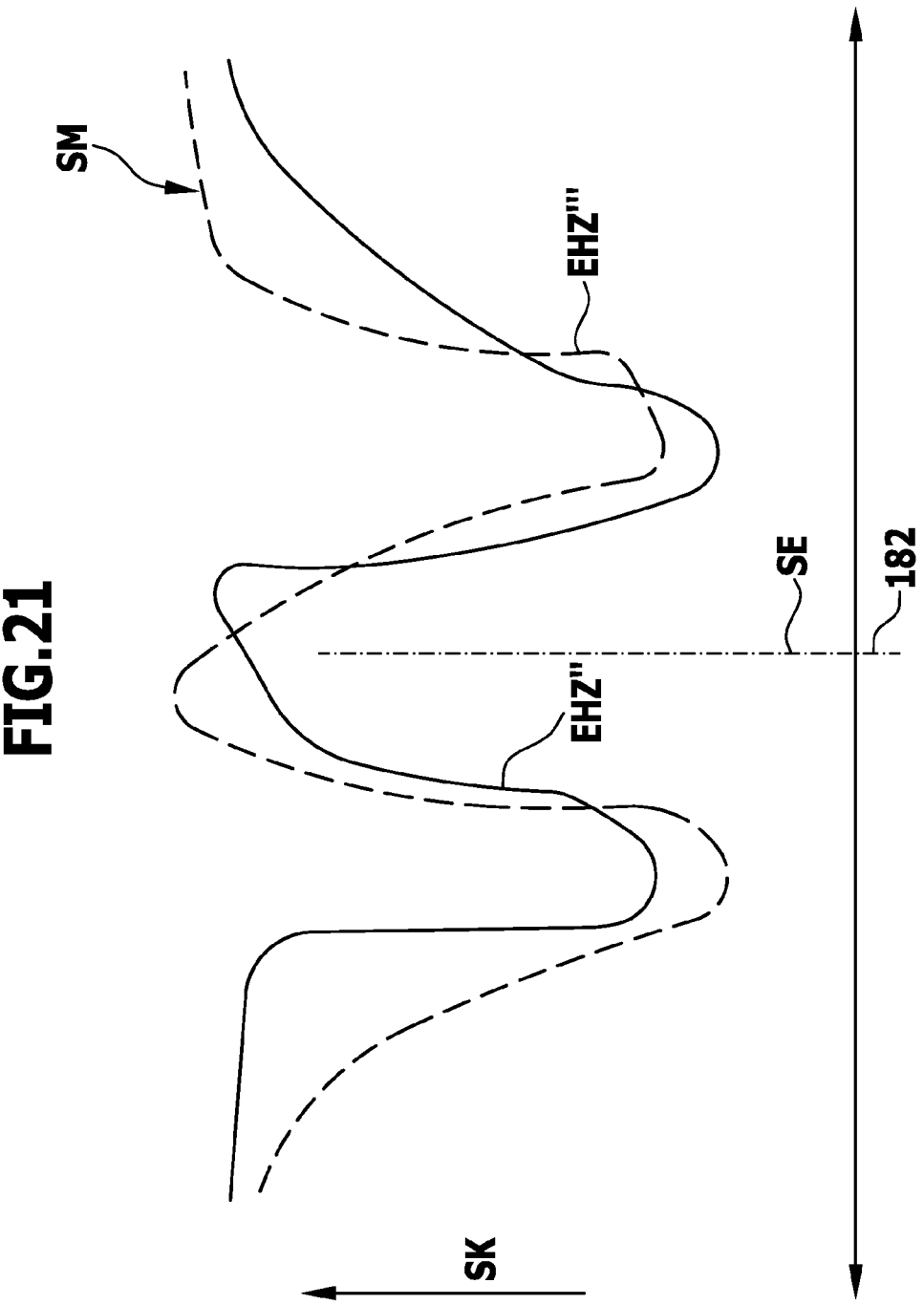

TRAILER COUPLING

CROSS-REFERENCE TO RELATED PATENT APPLICATIONS

This patent application claims the benefit of German application No. 10 2012 105 316.2, filed Jun. 19, 2012, the teachings and disclosure of which are hereby incorporated in their entirety by reference thereto.

BACKGROUND OF THE INVENTION

The invention relates to a trailer coupling for motor vehicles, comprising a coupling ball carrier which can be mounted on a vehicle body and a coupling ball with a ball body which has a ball surface extending between a ball attachment and an upper end surface of the ball body.

Trailer couplings of this type are known from the state of the art.

The coupling ball carrier can comprise a customary cross member mounted on a vehicle body with longitudinal members and a ball neck held on the cross member, wherein the ball neck is securely connected to the cross member.

The coupling ball carrier can, however, also comprise such a cross member with a removable ball neck or the coupling ball carrier can comprise a ball neck pivotable relative to the cross member.

The ball surface of the ball body comprises an appreciable part of a complete spherical surface but, as a rule, does not represent a complete spherical surface since, on the one hand, the ball body is seated on a ball attachment and, on the other hand, the ball body has in many cases an upper end surface in the form of a flattened area on a side located opposite the ball attachment and so the ball surface extends between the ball attachment and the upper end surface in the form of a flattened area but does not encompass it.

The object underlying the invention is to detect a body engaging on the coupling ball with respect to its form and/or alignment.

SUMMARY OF THE INVENTION

This object is accomplished in accordance with the invention, in a trailer coupling of the type described at the outset, in that the ball surface comprises a sensor zone, in which several stationary detection locations, which are different from one another, are located, that a sensor unit arranged stationarily in the ball body beneath the ball surface is associated with each detection location and that each sensor unit is designed such that it detects a body present in a close-proximity area above the ball surface at the respective detection location.

The advantage of the solution according to the invention is to be seen in the fact that as a result of the sensor zone and the arrangement of several detection locations in the sensor zone it is possible to recognize in an optimum manner the surface area, over which this body extends, and how this body is, where applicable, aligned.

The stationary arrangement of the detection locations and the sensor unit means that when a ball neck is located in a working position they are arranged stationarily, i.e. fixed in position, relative to the longitudinal central plane of the trailer coupling and, therefore, also, in particular, relative to the longitudinal central plane of the vehicle body and so all the information gathered by the sensor units at the detection locations is available in a coordinate system fixed relative to the longitudinal central plane of the trailer coupling.

In this respect, it is provided, in particular, for the close-proximity area to be an area above the ball surface which extends at least over a radial distance of 0.5 cm proceeding from the ball surface.

Furthermore, it is preferably provided for the close-proximity area to extend as far as a maximum radial distance of 5 cm, even better a maximum radial distance of 3 cm or advantageously a maximum radial distance of 1 cm above the ball surface.

With respect to the arrangement of the sensor zone within the ball surface, no further details have so far been given.

In this respect, it is provided, in particular, for the sensor zone to be arranged on a side of an equatorial plane of the ball surface which extends at right angles to a central axis of the coupling ball.

As a result, it is possible to arrange the sensor zone in a region of the ball surface which is subject to as little load as possible.

In this respect, it is provided, in particular, for the sensor zone to be arranged outside of a supporting zone of the ball surface, in which a carrier socket, for example a coupling head, normally rests.

Furthermore, it is preferably provided for the sensor zone to be arranged outside of a closure abutment zone, in which a closure element of a coupling head normally abuts.

In this respect, it is preferably provided for the sensor zone to extend at the most as far as a distance from the equatorial plane which corresponds to half the radius of the ball surface and so, as a result, it is possible, for example, to arrange the sensor zone outside of a supporting zone which is acted upon by a carrier socket of a coupling head.

It is even more advantageous when the sensor zone extends at the most as far as a distance from the equatorial plane which corresponds to a third of the radius of the ball surface so that it is ensured that the sensor zone is located outside of the supporting zone of the ball surface.

In principle, it is conceivable for the sensor zone to already be located starting from the equatorial plane or on both sides of the equatorial plane.

In order, however, to ensure, in particular, during any traction load on the ball body that the ball body has the necessary stability and wear resistance for an engaging coupling head, it is preferably provided for the sensor zone to be arranged at a distance from the equatorial plane which corresponds at least to a twentieth, even better a tenth of a radius of the ball surface.

With respect to the extension of the sensor zone over the ball surface, no further details have so far been given.

One particularly favorable arrangement of the sensor zone provides for this to be located between a lower boundary plane and an upper boundary plane which extend parallel to the equatorial plane.

In this case, one favorable solution provides for the upper boundary plane of the sensor zone to be at a distance from the equatorial plane which corresponds at the most to half the radius of the ball surface, preferably at the most a third of the radius of the ball surface.

Furthermore, it is favorably provided for the lower boundary plane of the sensor zone to be at a distance from the equatorial plane which corresponds at least to one twentieth, even better a tenth of a radius of the ball surface.

Within the scope of the invention it has proven to be particularly advantageous when the sensor zone is located at least in a rearward surface area of the ball surface since a sensor zone arranged in this way creates the possibility of recognizing whether a body is present in the close-proximity range or not, at least in the rearward surface area which is the most important for all the functions of the trailer coupling.

Furthermore, it is preferably provided for the sensor zone to extend around the central axis of the coupling ball at least over part of the circumference of the ball surface.

As a result, it can be detected over this part of the circumference whether a body is arranged in the close-proximity area of the ball surface within this part of the circumference or only in sections of this part of the circumference.

It is favorable, in particular, when the sensor zone stretches from the rearward surface area of the ball surface in opposite circumferential directions around the central axis at least over part of the circumference of the ball surface.

This solution allows the rearward surface area to be detected by the sensor zone, on the one hand, and, in addition, a part of the circumference of the ball surface adjoining the rearward surface area.

In this respect, it is favorable, in particular, when the sensor zone extends at least as far as a transverse plane of the coupling ball which extends through the central axis. In this case, it is, therefore, possible, in the area of the rearward half of the partial circumference of the ball surface, to detect to what extent a body is abutting on the ball surface or is close to it.

In conjunction with the preceding explanations concerning the position of the sensor zone, no further details have been given as to whether the sensor zone is located on a side facing the ball attachment or facing away from the ball attachment.

In principle, both positions are conceivable.

A solution which is particularly favorable with respect to the consistent wear load on the ball body provides, however, for the sensor zone to be located on a side of the equatorial plane facing away from the ball attachment.

In conjunction with the preceding explanations concerning the individual embodiments, no further details have been given as to how the sensor units operate.

One advantageous solution, for example, provides for each of the sensor units to detect a distance of the body from the ball surface at the respective detection location in the close-proximity area above the ball surface and so the sensor unit serves not only to detect the existence of a body as such but can also be used to detect how close the body is arranged above the ball surface.

With respect to the design of the sensor units themselves, no further details have so far been given.

One advantageous solution, for example, provides for the sensor units to be sensor units operating without contact.

Such sensor units operating without contact can operate according to various functional principles.

One advantageous solution, for example, provides for the sensor units to operate ultrasonically.

Another advantageous solution provides for the sensor units to be designed as sensor units detecting metallic bodies.

Such sensor units detecting metallic bodies are preferably designed such that they are sensor units detecting a magnetizable body.

As a result, metallic bodies, in particular, which are located in the close-proximity area of the ball surface, may be detected particularly advantageously and reliably.

The sensor units are, in particular, designed such that they are designed as sensor units which detect a change in a course of a magnetic field caused by the body.

It is provided, in particular, in the case of such sensor units for them to have a magnet generating the magnetic field and a magnetic field sensor, wherein the magnetic field sensor detects any change in the course of the magnetic field.

The magnet can, for example, be an electromagnet, wherein it is possible in the case of the electromagnet to activate it only for detecting the signal value at the prescribed point in time at the respective detection location. A permanent magnet is preferably provided as magnet.

It is, in particular, advantageously provided for each sensor unit to have a Hall sensor as magnetic field sensor.

With respect to the direction of detection, no further details have so far been given.

One particularly favorable solution provides, for example, for the sensor units to have, at the detection location, a direction of detection with a component extending radially to the central axis of the coupling ball.

Such a direction of detection at the respective detection location offers optimum possibilities for detecting the extent, to which the respective body enters the close-proximity field at the ball surface.

Furthermore, no further details concerning the position of the detection locations within the sensor zone have been given in conjunction with the preceding explanations concerning the solution according to the invention.

One advantageous solution, for example, provides for the detection locations to be arranged so as to follow one another in a circumferential direction extending around the central axis of the coupling ball, i.e. in order to minimize the number of sensors required they are distributed over the sensor zone as favorably as possible in the circumferential direction.

One particularly expedient solution provides for the detection locations to be located in a plane of detection which extends transversely to the central axis of the coupling ball, in particular at right angles to the central axis of the coupling ball.

With respect to the arrangement of the sensor units in the coupling ball, no further details have been given in conjunction with the preceding explanations concerning the individual embodiments.

One advantageous solution, for example, provides for the ball body of the coupling ball to be provided with at least one recess for accommodating at least one of the sensor units, i.e. the ball body can have, for example, an individual recess for each sensor unit.

It is, however, also conceivable to design the recess such that it can accommodate several of the sensor units.

One advantageous solution, for example, provides for the recess to be designed so as to extend at least over part of the circumference of the ball body.

One particularly favorable solution provides for the recess to extend in the ball body around the central axis of the coupling ball in a closed manner.

Such a recess could be designed, for example, as a groove in the ball body.

Another advantageous development of such a recess provides for the recess to be a recess extending in the ball body in a step-like manner.

It is provided, for example, in this case for the recess to have an inner wall which extends from the ball surface as far as a base of the recess, wherein the inner wall extends preferably cylindrically to the central axis. In this case, the recess can be closed particularly easily by a ring-shaped part abutting on the inner wall.

One particularly favorable solution provides for a supplementary ball body to be insertable into the recess and for this to have an outer surface supplementing the ball surface in the region of the recess so that the ball surface is supplemented completely by the supplementary ball body in the region of the recess.

Furthermore, it is preferably provided in this case for the supplementary ball body and the recess to form together a free space for accommodating the sensor units.

In conjunction with the preceding solutions it has not been specified in detail how the magnetic field sensors are arranged in the recess or the free space.

It would, for example, be conceivable to arrange all the magnetic field sensors individually which does, however, increase the work necessary during the assembly of the trailer coupling according to the invention.

For this reason, it is provided for all the magnetic field sensors to be combined to form an array of sensors which form a coherent part.

The magnetic field sensors may be mounted particularly favorably when the array of sensors forms a circle of sensors which surrounds permanent magnets externally and radially in relation to the central axis.

In this respect, the permanent magnets can be individual magnets.

One particularly expedient solution provides, however, for the array of sensors to have a ring consisting of permanent magnets.

With respect to the type of bodies which are intended to be detected by the sensor units, no further details have so far been given.

One solution, for example, provides for the body detectable by the sensor units to be formed by a coupling of a load carrier.

Another advantageous solution provides for the body detectable by the sensor units to be formed by a coupling head of a trailer.

Furthermore, no further details have been given in conjunction with the preceding explanations concerning the individual embodiments as to how the sensor units are intended to be operated and interconnected.

One advantageous solution provides for the sensor units to be coupled to an evaluation unit which detects and evaluates the sum total of the signal values generated by the sensor units.

As a result, it is possible to obtain information as to the extent, to which the respective body abuts or engages on the ball surface, as a result of the entirety of the sensor units.

The evaluation unit can operate in the most varied of ways.

One advantageous mode of operation provides for the evaluation unit to detect the signal values detected at the respective detection locations in terms of the detection location, i.e. for each signal value to be detected and saved in direct relation to the respective detection location.

In this respect, the detection locations are, in particular, arranged stationarily in relation to the longitudinal central plane of the trailer coupling and so all the signal values are also present in a coordinate system provided stationarily to the longitudinal central plane.

In this respect, it is possible, in particular, for the evaluation unit to compile from the signal values a pattern of signal values for the respective body, for example for the coupling or the coupling head, which is based on the detection location.

In the case of the solution according to the invention, the pattern of signal values based on the detection location is also present, in particular, in a coordinate system which is stationary relative to the longitudinal central plane.

In this respect, it is advantageously provided, in particular in the case of a coupling or a coupling head, for the pattern of signal values for the body, in particular the coupling or the coupling head, which is based on the detection location to be symmetrical to a plane of symmetry of the body and, therefore, in particular of the coupling or the coupling head.

In order to be able to save and evaluate the pattern based on the detection location in a simple manner, it is preferably provided for the evaluation unit to approximate the pattern of signal values based on the detection location by means of an envelope, the values of which are a function of the detection locations.

In this respect, it is conceivable, for example, for the envelope to be determined by way of parameter adjustment of functions predetermined for the envelope.

Such an envelope has, in addition, the advantage that it can be evaluated more easily.

It is preferably provided, for example, for the evaluation unit to ascertain the plane of symmetry, in particular its position relative to the longitudinal central plane of the trailer coupling, for the respective pattern of signal values or for the respective envelope.

During such ascertainment of a plane of symmetry, the relative rotary position of the body with respect to the central axis of the coupling ball as axis of rotation and the longitudinal central plane of the trailer coupling as reference for the angle of rotation may be ascertained, in particular, in a simple manner.

For this reason, it is preferably provided for the evaluation unit to ascertain an angle between the plane of symmetry of the body, in particular the coupling or the coupling head, and the longitudinal central plane of the trailer coupling on the basis of the position of the plane of symmetry relative to a longitudinal central plane of the vehicle body or the trailer coupling so that, as a result, a rotary position of the body, in particular the coupling or the coupling head, relative to the longitudinal central plane of the trailer coupling can be ascertained in a simple manner.

Additional features and advantages of the invention are the subject matter of the following description as well as the drawings illustrating several embodiments.

BRIEF DESCRIPTION OF THE DRAWINGS

FIG. 20 shows an illustration similar to FIG. 16 of a fifth embodiment with sensor units according to the invention in a further variation of a coupling ball and FIG. 21 shows an illustration of a pattern based on the detection location during tilting of the body engaging on the coupling ball about a longitudinal and/or a transverse axis.

DETAILED DESCRIPTION OF THE INVENTION

Figure 1:
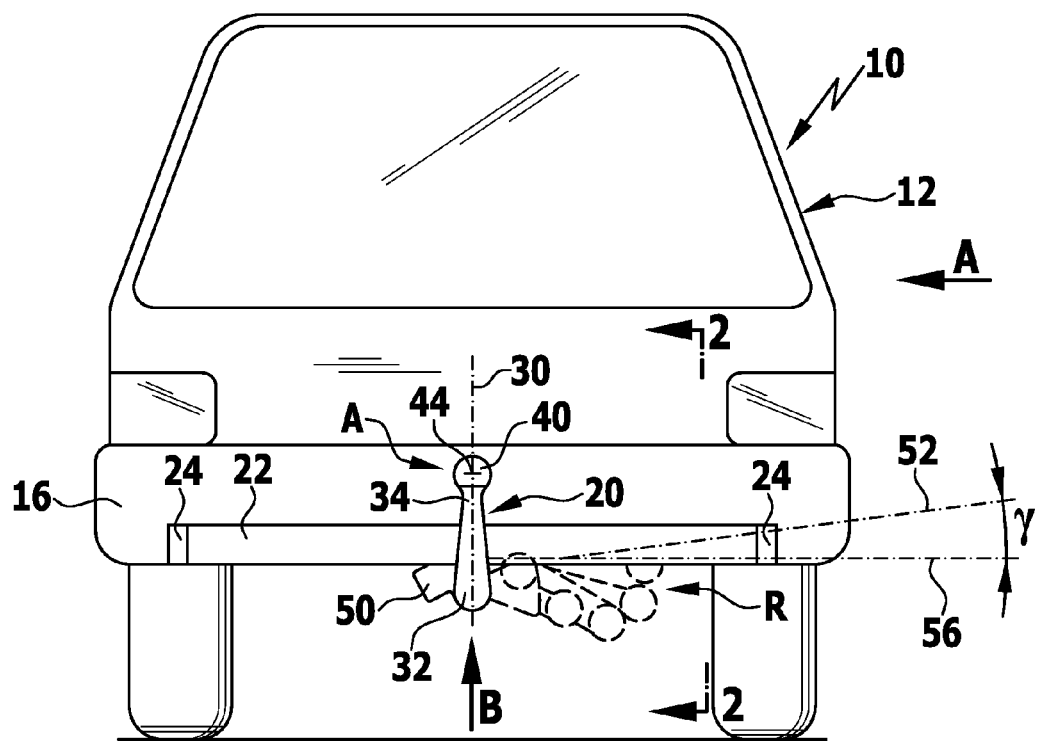
FIG. 1 shows a view of a motor vehicle with a trailer coupling according to the invention from behind.
Figure 2:
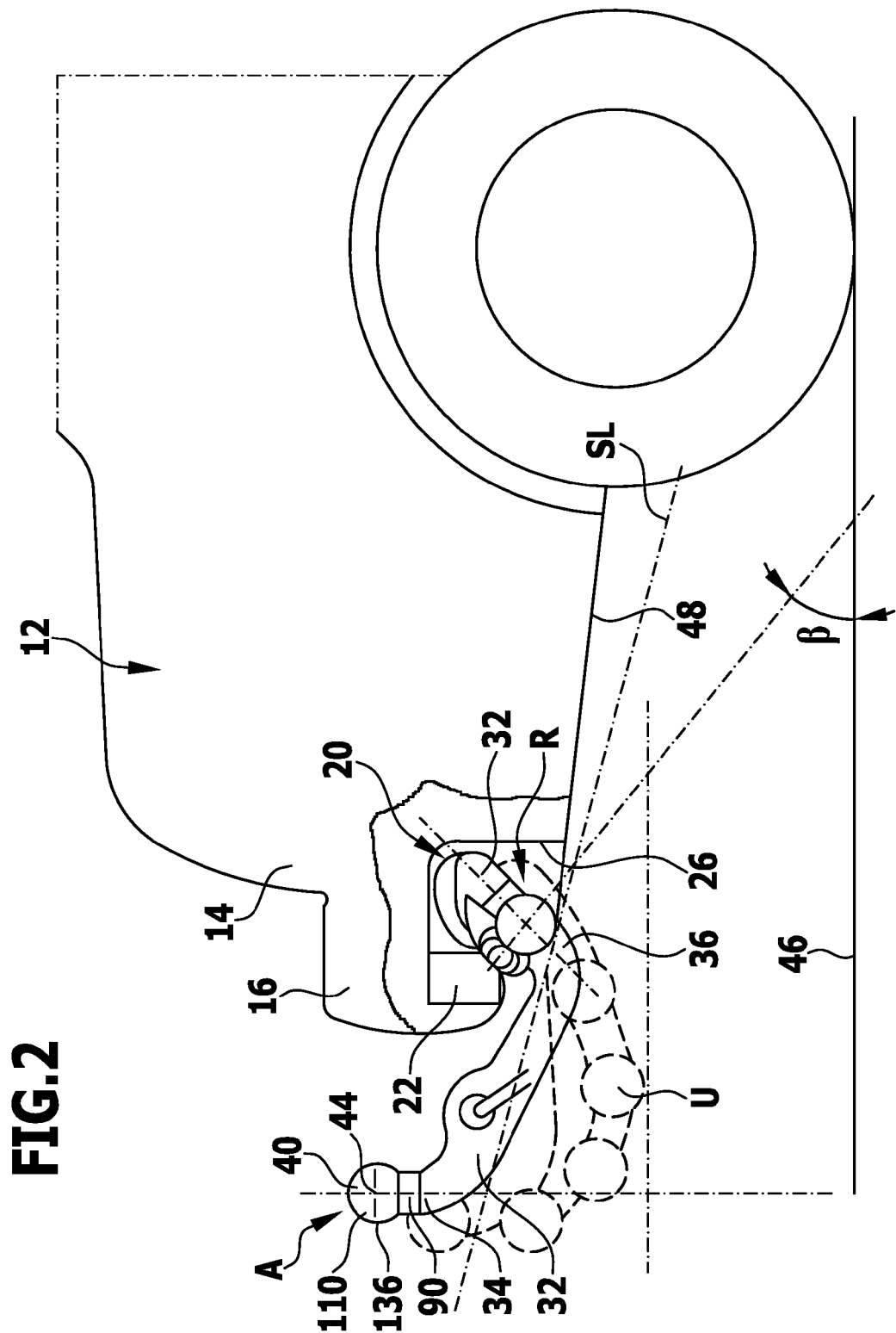
FIG. 2 shows a side view of the motor vehicle in the direction of arrow A in FIG. 1 with a body partially cut away in the region of the trailer coupling.
Figure 3:
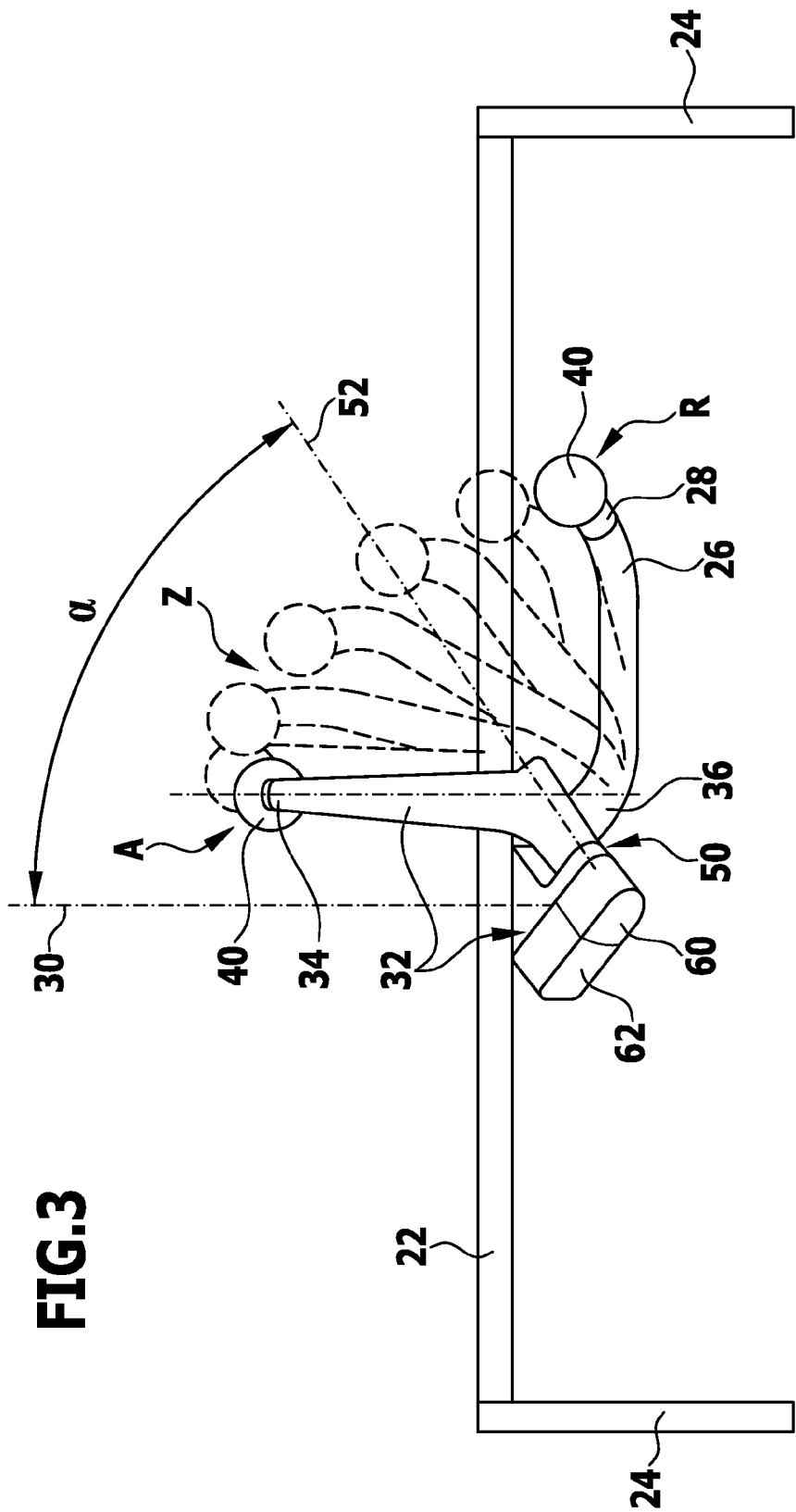
FIG. 3 shows a view in the direction of arrow B in FIG. 1.

A motor vehicle designated as a whole as 10 in FIGS. 1, 2 and 3 and having a motor vehicle body 12 is provided with a trailer coupling 20 at a rear area 14 of the motor vehicle body in the region of a rear bumper unit 16 of the motor vehicle body 12.

The trailer coupling 20 comprises a cross member 22 which is connected to the motor vehicle body 12 via lateral longitudinal members 24, wherein the longitudinal members 24 extend parallel to a longitudinal central plane 30 of the motor vehicle body 12 whereas the cross member 22 extends transversely to the longitudinal central plane 30 of the motor vehicle body 12 and parallel to an end 26 thereof on the rear side.

The trailer coupling 20 further comprises a ball neck which is designated as a whole as 32 and bears a coupling ball designated as 40 at a first end 34 whereas a second end 36 of the ball neck 32 is, for example, mounted on the cross member 22 by means of a pivot bearing unit designated as a whole as 50 so that the ball neck 32 is mounted so as to be pivotable between a working position A and a rest position R.

In this respect, the ball neck 32 with the coupling ball 40 is, in the working position A, arranged symmetrically to the longitudinal central plane 30 at least in the region of its first end 34 and the coupling ball 40 is also positioned with its central axis 44 in the longitudinal central plane 30 so that a trailer can be attached to the coupling ball 40.

As a result, the longitudinal central plane 30 also represents, at the same time, the longitudinal central plane 30 of the trailer coupling 20.

Furthermore, the ball neck 32 with the coupling ball 40 borne by it is pivotable by the pivot bearing unit 50 into the rest position R, in which the ball neck 32 is located between the cross member 22 and the rear-side end 26 of the motor vehicle body 12, in particular on a side, which faces away from a roadway 46, of a line of sight SL tangential to the bumper unit 16 and preferably above an underbody surface 48 which is defined by the motor vehicle body 12 and the lower edge of the bumper unit 16 and faces the roadway 46.

In this respect, the cross member 22 with the longitudinal member 24, the pivot bearing unit 50 and the ball neck 32 together form a coupling ball carrier 52 for the coupling ball 40 which, alternatively to the solution described, can also be designed such that the ball neck is connected detachably and removably or also rigidly to the rear area 14 of the motor vehicle body 12.

In principle, the pivot bearing unit 50 can be designed such that the ball neck 26 is pivotable about several pivot axes in order to move it from the working position A into the rest position R.

In the advantageous embodiment illustrated in FIGS. 1 to 3, the pivot bearing unit 50 is designed such that it provides for pivoting of the ball neck 26 about a single pivot axis 54 which extends at an angle to the transverse plane and at an angle to the longitudinal central plane 30, preferably forms an angle α with the longitudinal central plane which is in the range of between 50 and 80 degrees in the projection onto a horizontal plane illustrated in FIG. 1.

Furthermore, the pivot axis 54 forms an angle γ with the horizontal plane 56 which is between 0 and 30 degrees in the case of a projection onto a vertical plane extending at right angles to the longitudinal central plane 30 of the vehicle.

In order to fix the ball neck 26 in the working position A and the rest position R, the pivot bearing unit 50 is provided with a locking device which is designated as a whole as 60 and can operate in accordance with the most varied of principles but is always in a position to secure the ball neck 32 in the working position A and the rest position R so as to be immovable relative to the pivot bearing unit 50 and, therefore, also relative to the cross member 22 and, therefore, altogether relative to the motor vehicle body 12.

Furthermore, the pivot bearing unit 50 is provided, where applicable, with a drive unit 62, with which the pivoting movement about the pivot axis 54 can be realized by means of a motor drive.

Alternatively to the provision of the drive unit 62, it is, however, also possible to provide a manual pivoting between the working position A and the rest position R following a respective release of the locking device 60.

Figure 4:
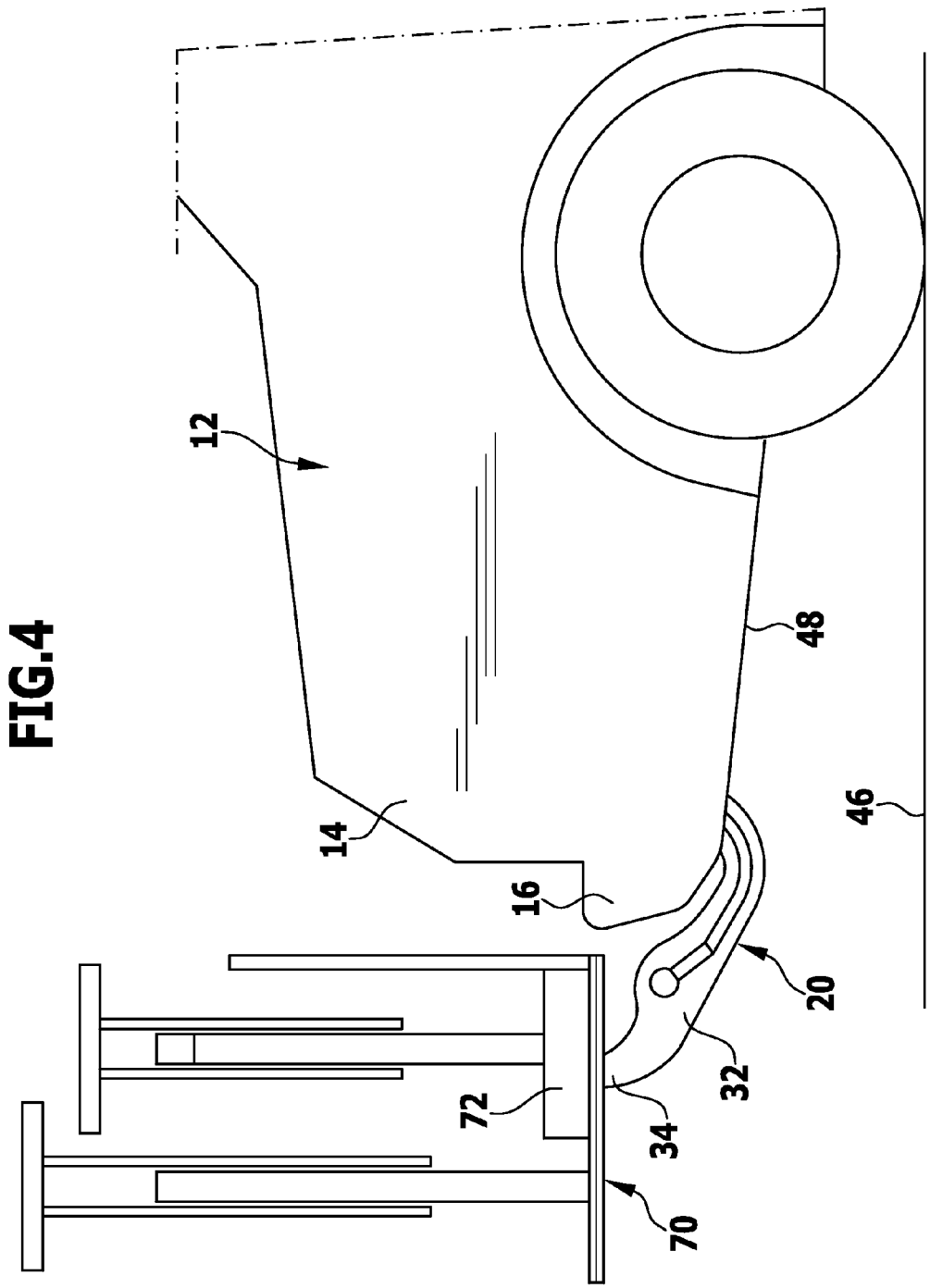
FIG. 4 shows a side view similar to FIG. 2 with a load carrier mounted on the trailer coupling.

As illustrated in FIG. 4, such a trailer coupling 20 serves, for example, to mount on the vehicle body 12 a load carrier 70 which is provided with a coupling 72 which, on the one hand, receives the coupling ball 40 and, therefore, provides a form locking fixing in position in the region of the coupling ball 40 and, on the other hand, forms, in addition, either a force locking connection with the coupling ball in the region thereof or a form locking and/or force locking connection with the ball neck 26 in the region thereof, in particular in the region of the first end 34, in order to fix the load carrier 70 in position so as to be, altogether, immovable on the ball neck 32, wherein the ball neck 32 carries the entire load carrier 70 and absorbs all the tilting torque which emanates from the load carrier 70.

Such a load carrier 70 is, for example, a customary load carrier for bicycles which can therefore be transported close to the rear area 14 of the motor vehicle body 12.

Figure 5:
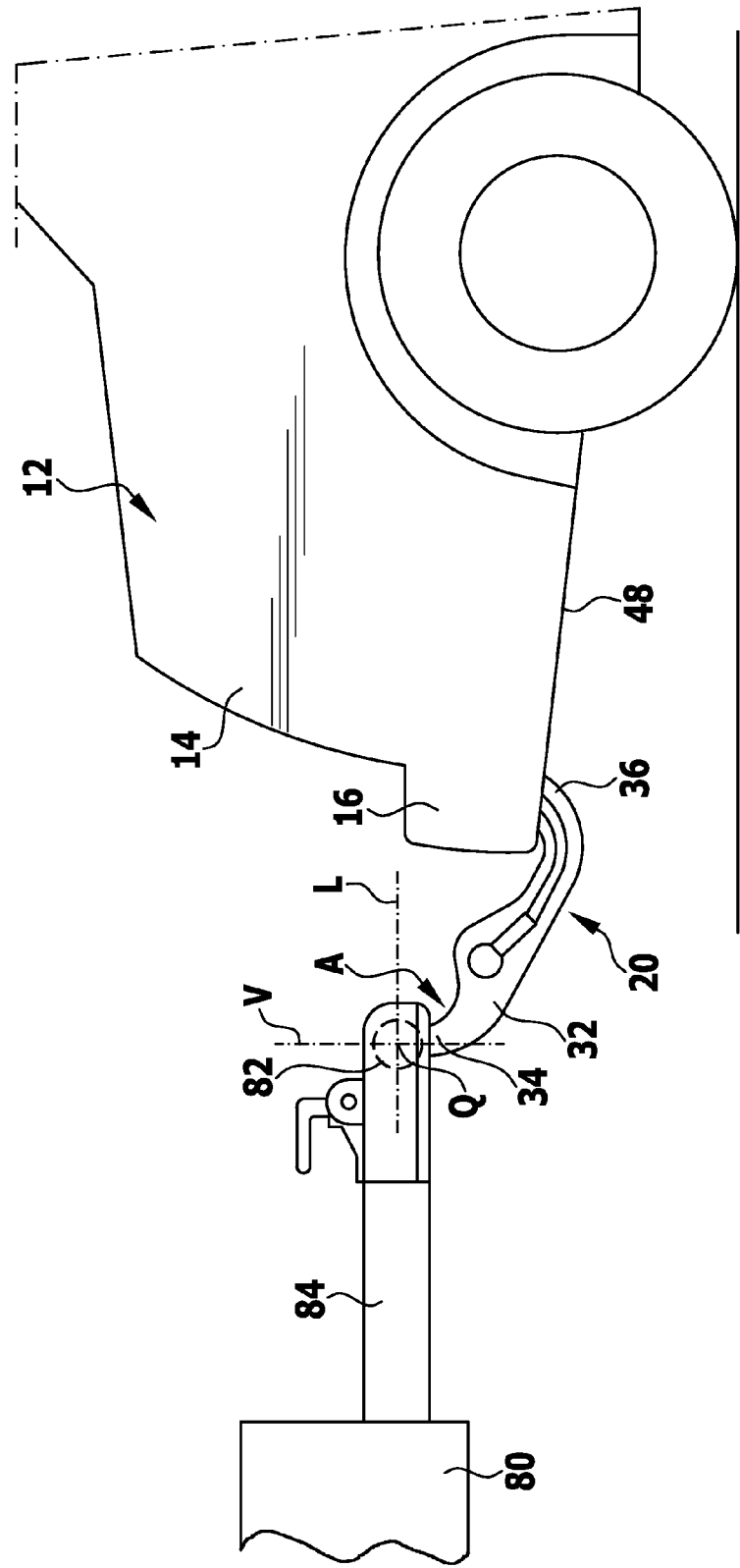
FIG. 5 shows a side view similar to FIG. 2 with a trailer attached to the trailer coupling.

As illustrated in FIG. 5, such a trailer coupling 20 also serves, however, to pull a trailer 80 which is indicated schematically in FIG. 5, wherein the trailer 80 engages on the coupling ball 40 with a coupling head 82 and wherein the coupling head 82 is arranged at a front end of a drawbar 84 of the trailer 80.

In this respect, the coupling head 82 forms with the coupling ball 40 a traction connection similar to a ball joint so that the coupling head 82 can be pivoted relative to the coupling ball 40 in the working position A not only about a longitudinal axis L lying in the longitudinal central plane 30, a transverse axis Q at right angles to the longitudinal central plane 30, which both extend parallel to a horizontal plane, but also about a vertical axis V which is located in the longitudinal central plane 30.

Figure 6:
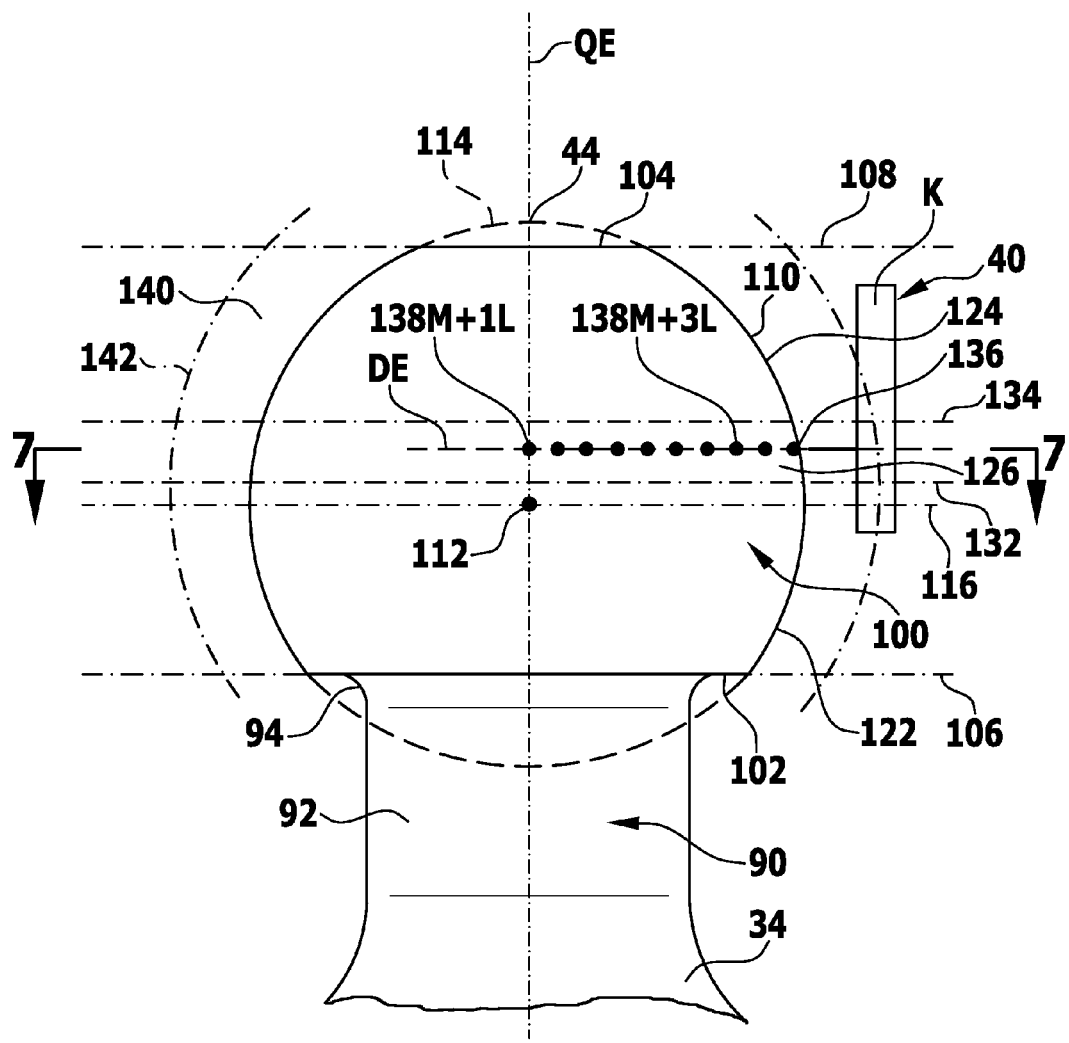
FIG. 6 shows an enlarged illustration of the coupling ball in the view according to FIG. 2.

As illustrated in FIG. 6, a coupling ball 40 according to the invention comprises a ball attachment 90 which adjoins the first end 34 of the ball neck 32 and has a cylindrical outer surface 92 which extends cylindrically to the central axis 44 of the coupling ball 40 and merges with a rounded area 94 into a ball body 100 which extends as far as an upper end surface 104 proceeding from a lower end surface 102 which extends at right angles to the central axis 44.

In this respect, the lower end surface 102 is preferably an annular surface which encloses the rounded area 94 at the transition from the cylindrical outer surface 92 of the ball attachment 90 to the ball body 100 and is located in a lower geometrical plane 106 extending at right angles to the central axis 44 while the upper end surface 104 is located in an upper geometrical plane 108 extending at right angles to the central axis 44 and so the planes 106 and 108 extend parallel to one another.

Furthermore, the diameter of the upper end surface 104 is less than the diameter of the cylindrical outer surface of the ball attachment 90.

Between the lower end surface 102 and the upper end surface 104, the ball body 100 has a ball surface 110 which represents a spherical surface section of a spherical surface 114 extending around a central point 112, wherein the central point 112 is located on the central axis 44 and the ball surface 110 merely comprises that part of the spherical surface 114 which is located between the lower geometrical plane 106 and the upper geometrical plane 104.

Furthermore, the central point 112 is at a shorter distance from the lower plane 106 than from the upper plane 108 and so an equatorial plane 116 likewise parallel to the planes 106 and 108, which are parallel to one another, divides the ball surface 100 into a lower ball zone 122 which is located between the lower plane 106 and the equatorial plane 116 and an upper ball zone 124 which is located between the equatorial plane 116 and the upper plane 108.

Both the lower ball zone 122 and the upper ball zone 124 extend rotationally symmetrically about the central axis 44 and therefore represent areas of the ball surface 110.

In the case of the trailer coupling 20 according to the invention, the ball body 100 has a sensor zone 126 which is preferably located in the upper ball zone 124, namely close to the equatorial plane 116.

In this respect, the sensor zone 126 is preferably located between a lower boundary plane 132 and an upper boundary plane 134 which likewise extend at right angles to the central axis 44 and, therefore, parallel to the lower plane 106, the upper plane 108 and the equatorial plane 116, wherein the lower boundary plane 132 and the upper boundary plane 134 are at a distance from one another which is in the range of 4 mm to 8 mm.

The lower boundary plane 132 of the sensor zone 126 is preferably located at a distance from the equatorial plane 116 which is in the range of 0.5 to 4 mm, preferably 1 to 3 mm.

The sensor zone 126 can extend, for example, rotationally symmetrically about the central axis 44.

The sensor zone 126 can, however, also be located merely in a rearward surface area 136 of the ball surface 110 which faces away from the rear area 14 of the motor vehicle body 12.

Figure 7:
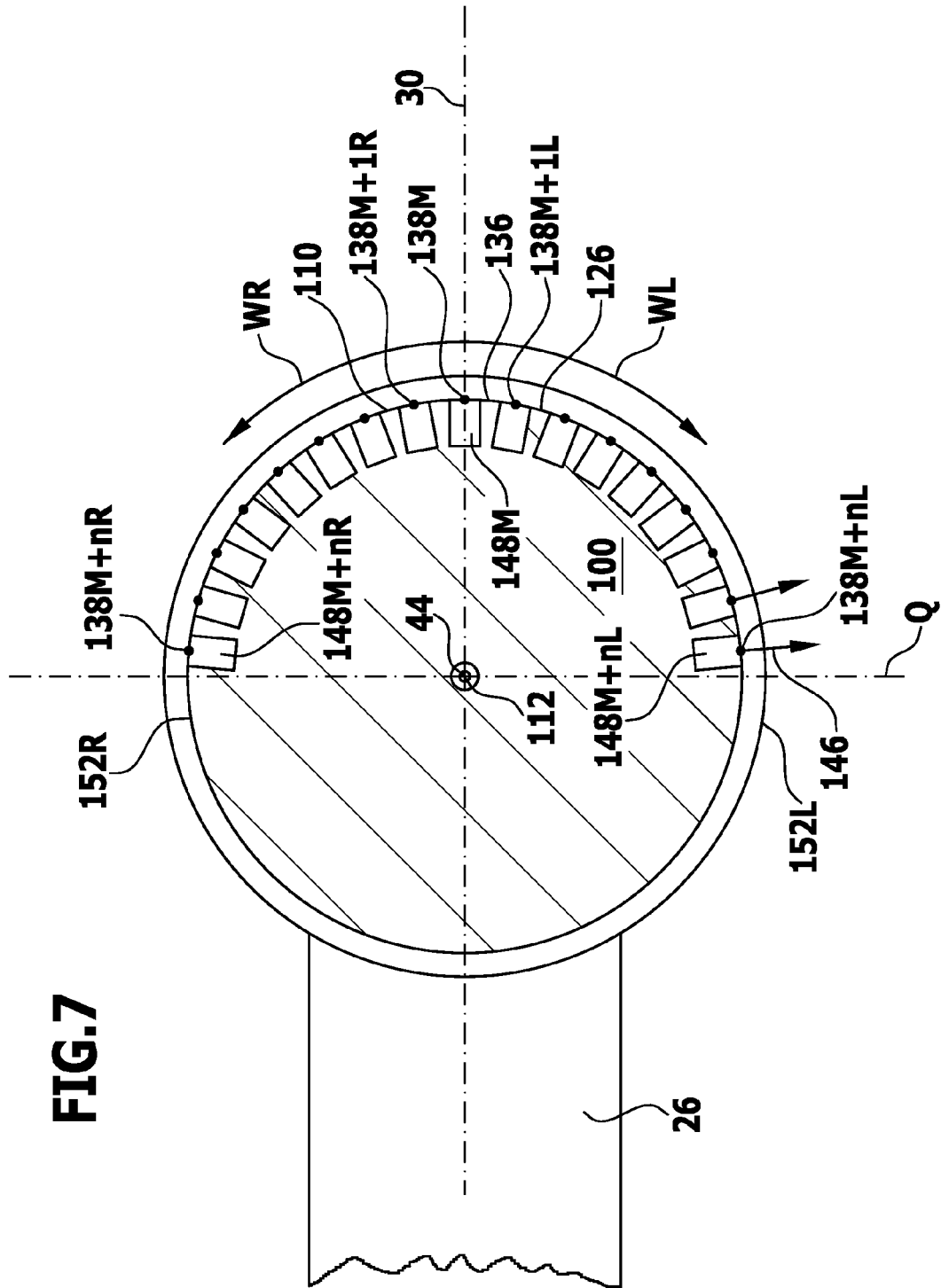
FIG. 7 shows a section along line 7-7 in FIG. 6.
Figure 8:
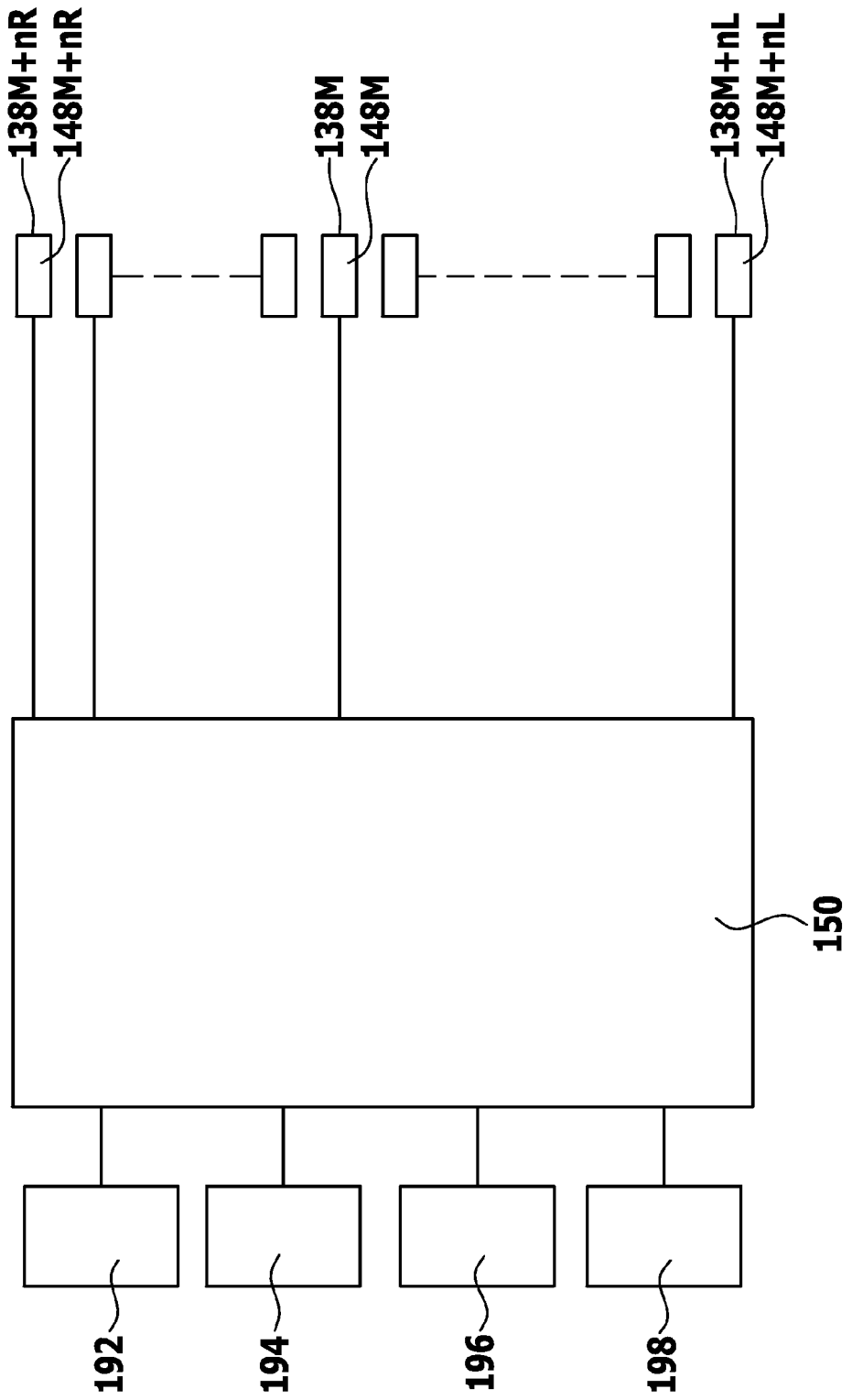
FIG. 8 shows a schematic illustration of an evaluation unit connected to the sensor units and additional units of the motor vehicle.

The sensor zone 126 extends, for example, on both sides of the longitudinal central plane 30 around the central axis 44, each time over an angular area WL and WR which can be selected to be of different sizes proceeding from the longitudinal central plane 30, for example, as illustrated in FIG. 7, 90° and so the sensor zone 126 extends on both respective sides of the longitudinal central plane 30 as far as a transverse plane Q which extends through the central axis 44 and at right angles to the longitudinal central plane 30.

Individual detection locations 138, which are arranged stationarily relative to the ball body 100 and, therefore, also stationarily in relation to the coupling ball 40, are located in this sensor zone 126, wherein proceeding from a detection location 138M located in the longitudinal central plane 30 the detection locations 138M+1L to 138M+nL follow on, for example, in the direction WL while in the direction R the detection location 138M is followed by the detection locations 138M+1R to 138M+nR.

The detection locations 138 are geometric locations, at which a detection of a body K can take place which is located within a close-proximity area 140 above the ball surface 110, wherein the close-proximity area 140 is defined by a geometrical spherical surface 142 which has a radius which is at the most 1 cm, even better at the most 0.5 cm greater than the radius of the spherical surface 114 determining the ball surface 110.

For example, the detection locations 138 are all located in a plane of detection DE extending at right angles to the central axis 44.

Preferably, a detection of the body K takes place either via ultrasound or via magnetic field sensors at the respective detection locations 138.

In order to be able to carry out detection of the body K selectively at the individual detection locations 138, sensor units 148 which are arranged stationarily are provided in the ball body 100 at the detection locations 138 and these sensor units are seated in the ball body 100, namely close to or adjoining the detection locations 138 and thereby carry out detection at the respective detection location 138 with a direction of detection 146 which is directed radially to the central point 112 of the ball surface 110, whether or not a body K is present at the respective detection location 138 in the close-proximity area 140.

In order to evaluate signals from the sensor units 148, an evaluation unit 150 is associated with the sensor units and this evaluation unit detects the signals of all the sensor units 148 and is, therefore, in a position to detect, at which of the detection locations 138 a body K is present in the close-proximity area 140 above the ball surface 110 or not and to generate a signal SK depending on whether the body K is present or not.

As a result of the detection locations 138 arranged in the sensor zone 126, the evaluation unit 150 is, when, for example, the sensor zone 126 extends as far as the transverse plane QE, in a position to detect whether a body K is present at the detection locations 138 which are, for example, close to the transverse plane Q, i.e. in side areas 152 L, R, wherein this would be brought about by the sensor units 148 M+nR and M+nL, or whether a body K is present between the side areas 152L and 152R, for example close to the longitudinal central plane 30, wherein this would be detected by the sensor unit 148M or also by the sensors 148 lying therebetween.

This means that the evaluation unit 150 is in a position to recognize the geometrical extension, with which or to what extent a body K extends in the close-proximity area 140 located above the sensor zone 126.

As a result, it is possible to recognize whether the coupling 72 of, for example, a load carrier 70 is engaging on the ball surface 110 or whether the coupling head 82 of the trailer 80 is engaging on the ball surface 110.

Figure 9:
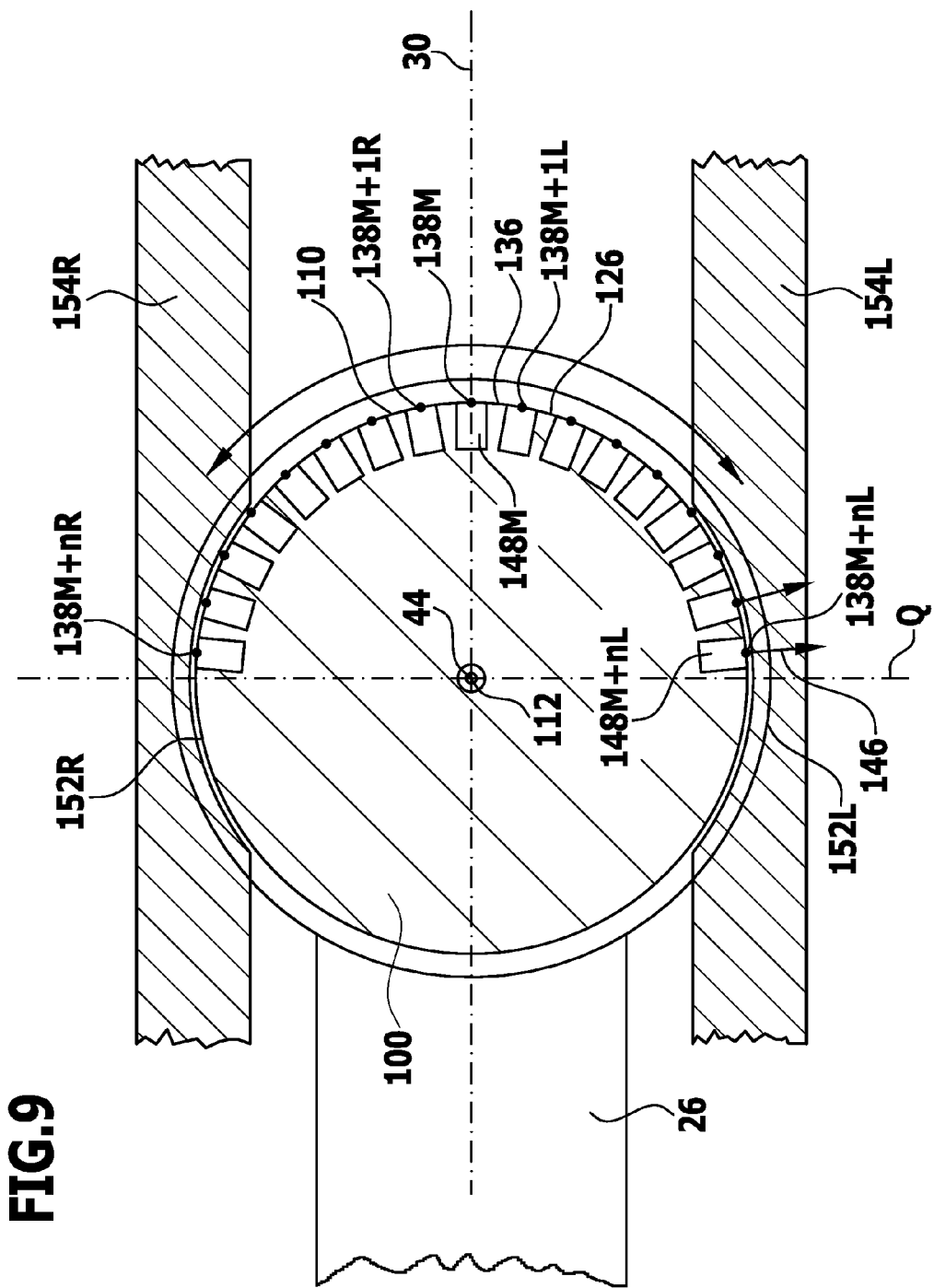
FIG. 9 shows a section corresponding to FIG. 7 in the case of a coupling of a load carrier engaging on the coupling ball.

If, for example, as illustrated in FIG. 9, the ball body 100 is clamped by way of clamping sockets 154$_L$ and 154$_R$ abutting on the sides, the clamping sockets 154 will be detected at the detection locations 138 M+nL to 138 M+(n−4)L and 138 M+nR to 138 M+(n−4)R and the corresponding sensor units 148 and so the evaluation unit 150 can recognize that, for example, a coupling 72 with the lateral clamping jaws 154$_L$ and 154$_R$ is engaging on the ball body 100.

In this case, the evaluation unit 150 recognizes that a body K, namely the respective clamping socket 154, is present at the detection locations 138 M+nL to 138 M+(n−4)L and 138 M+nR to 138 M+(n−4)R whereas no body K is present at the remaining detection locations 138.

Figure 10:
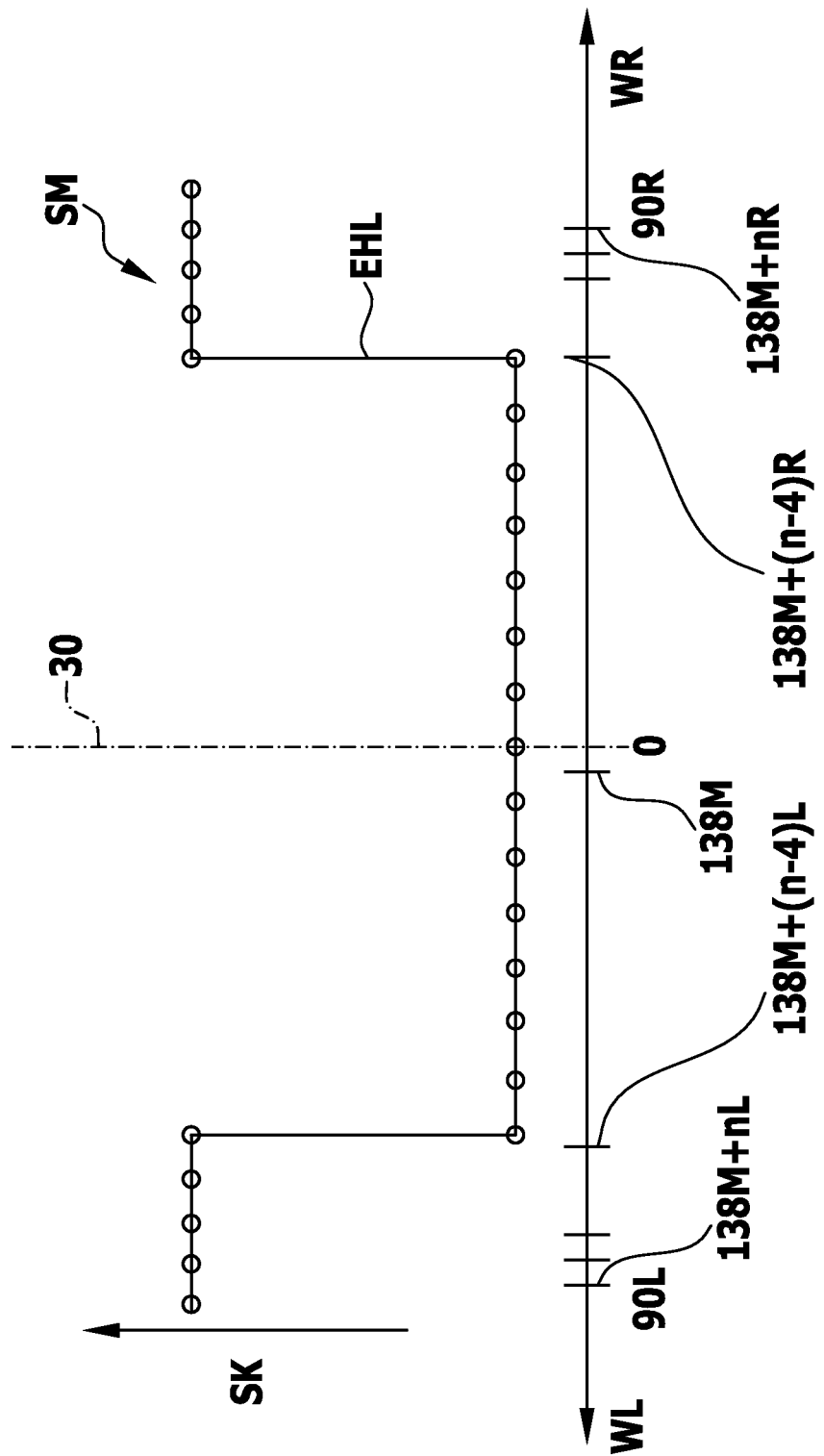
FIG. 10 shows an illustration of signal values plotted over the respective detection location in the case of the coupling engaging on the coupling ball in accordance with FIG. 9 with the pattern based on the detection location resulting therefrom.

As illustrated in FIG. 10, this leads to a characteristic pattern of signal values SM consisting of signal values SK which are detected by the evaluation unit 150 and plotted over the respective angular areas WL and WR and, at the detection locations 138, at which the clamping sockets 154 are detected, are greater, for example, than at the detection locations 138, at which no body K is detected. As a result of the pattern of signal values SM of the signal values SK plotted over the angular areas WL and WR, an envelope EHL can be set by the evaluation unit 150 and this then has a shape symmetrical to the longitudinal central plane 30.

Whether the signal values are high when a body K is present and low when the body K is not present, or vice versa, is dependent on the mode of operation of the sensor units 148.

As a result, the evaluation unit 150 can compare the envelope EHL which has been ascertained with stored reference envelopes and recognize, as a result, that the trailer coupling 20 is supporting the load carrier 70.

Figure 11:
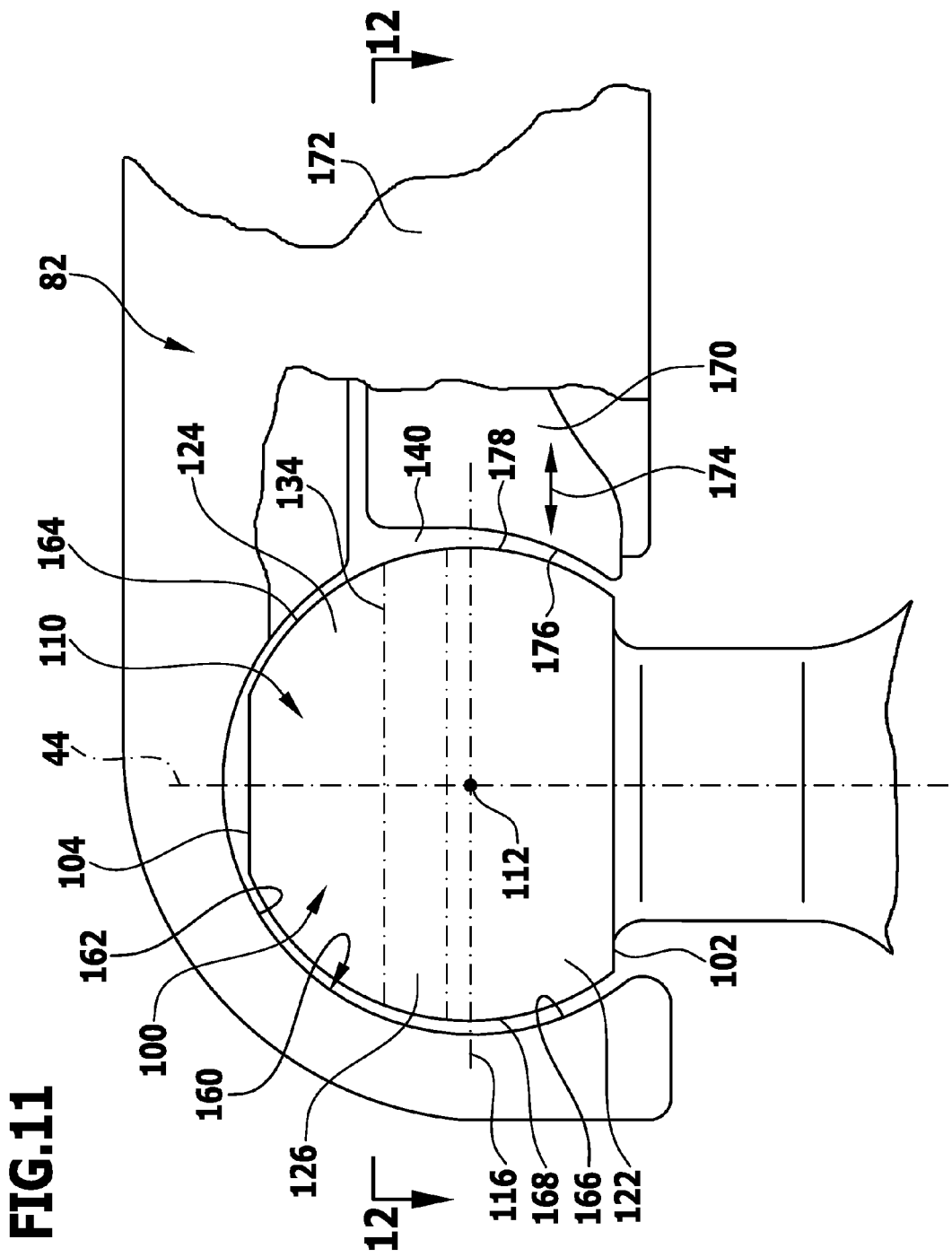
FIG. 11 shows an illustration of a coupling ball with a coupling head engaging on this coupling ball.

In contrast to the coupling 72, the coupling head 82, as illustrated in FIG. 11, abuts on the ball body 100 with a ball receptacle 160, wherein the ball receptacle 160 comprises, on the one hand, a supporting socket 162 which abuts on the upper ball zone 124 of the ball surface in the region of a supporting zone 164 of the ball surface 110 which is located above the upper boundary plane 134 of the sensor zone 126 and, in addition, the ball receptacle 160 comprises a traction socket 166 which abuts on the ball surface 110 in a surface area 168 which is forwards in the direction of traction and faces the rear area 14 of the motor vehicle body 12 during travel straight ahead but during cornering migrates in the direction of the transverse plane Q.

The surface area 168, on which the traction socket 166 abuts, extends beneath the supporting zone 164, for example adjoining the supporting zone 164, in the region of the upper ball zone 124 as far as the equatorial plane 116 and beyond the equatorial plane 116 into the region of the lower ball zone 122, where applicable as far as the lower end surface 102.

In addition, the ball receptacle 160 is fixed in position on the ball body 100 by a closure element 170 which is movable relative to the ball receptacle 160 and can be moved on the ball body 100 towards and away from it, for example parallel to a direction 174, by a closure unit 172 arranged on the ball receptacle 160, wherein the closure element 170 can abut with a contact surface 176 at least on a closure contact zone 178 of the lower ball zone 122 of the ball surface 110 in order to prevent, altogether, any release of the ball receptacle 160, in particular any lifting of the ball receptacle 160, away from the ball body 100.

Figure 12:
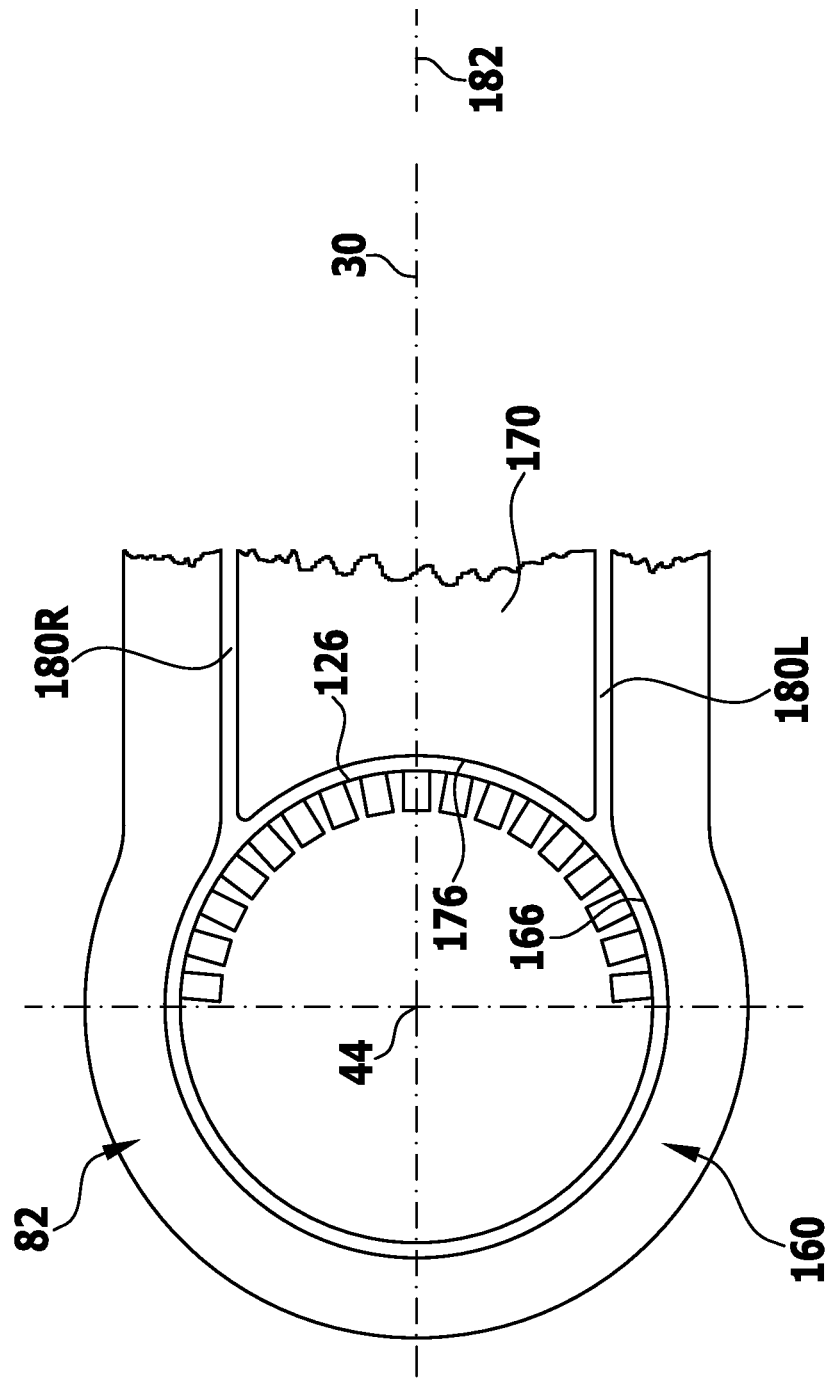
FIG. 12 shows a section along line 12-12 in FIG. 11.

In this respect, the closure element 170 preferably extends beyond the equatorial plane 116 and runs, not necessarily abutting, as far as the sensor zone 126 within the close-proximity area 140 of the sensor zone 126 so that, as illustrated in FIG. 12, the signal values SK caused by the traction socket 166, on the one hand, and the signal values SK caused by the closure element with the contact surface 176, on the other hand, are generated at the detection locations 138 of the sensor zone 126 and that, in addition, it is possible to detect gaps 180L and 180R between the closure element 170 and the ball receptacle 160, which are necessary for the movement of the closure element 170 relative to the ball receptacle 160, at the detection locations 138 corresponding to the position of the gaps 180L and 180R for as long as the contact surface 176 extends around the central axis 44 within the sensor zone 126.

Since the coupling head 82 has a longitudinal central plane 182 as plane of symmetry SE and both the traction socket 166 and the closure element 170 are arranged symmetrically to the longitudinal central plane 182, the longitudinal central plane 182 of the coupling head 82 coincides with the longitudinal central plane 30 of the motor vehicle body 12 and the trailer coupling 20 when the motor vehicle 10 is traveling exactly straight ahead. This situation is illustrated in FIG. 12.

During travel straight ahead, as illustrated in FIG. 12, high signal values SK result, for example, at the detection locations 138 which detect the traction socket 166 and high signal values SK at the detection locations 138 which detect the closure element 170 with the contact surface 176 but low signal values SK at the detection locations 138 which detect the gap 180 between the closure element 170 and the ball receptacle 160 and so a characteristic pattern of signal values SM can likewise be detected by the evaluation unit 150.

Figure 13:
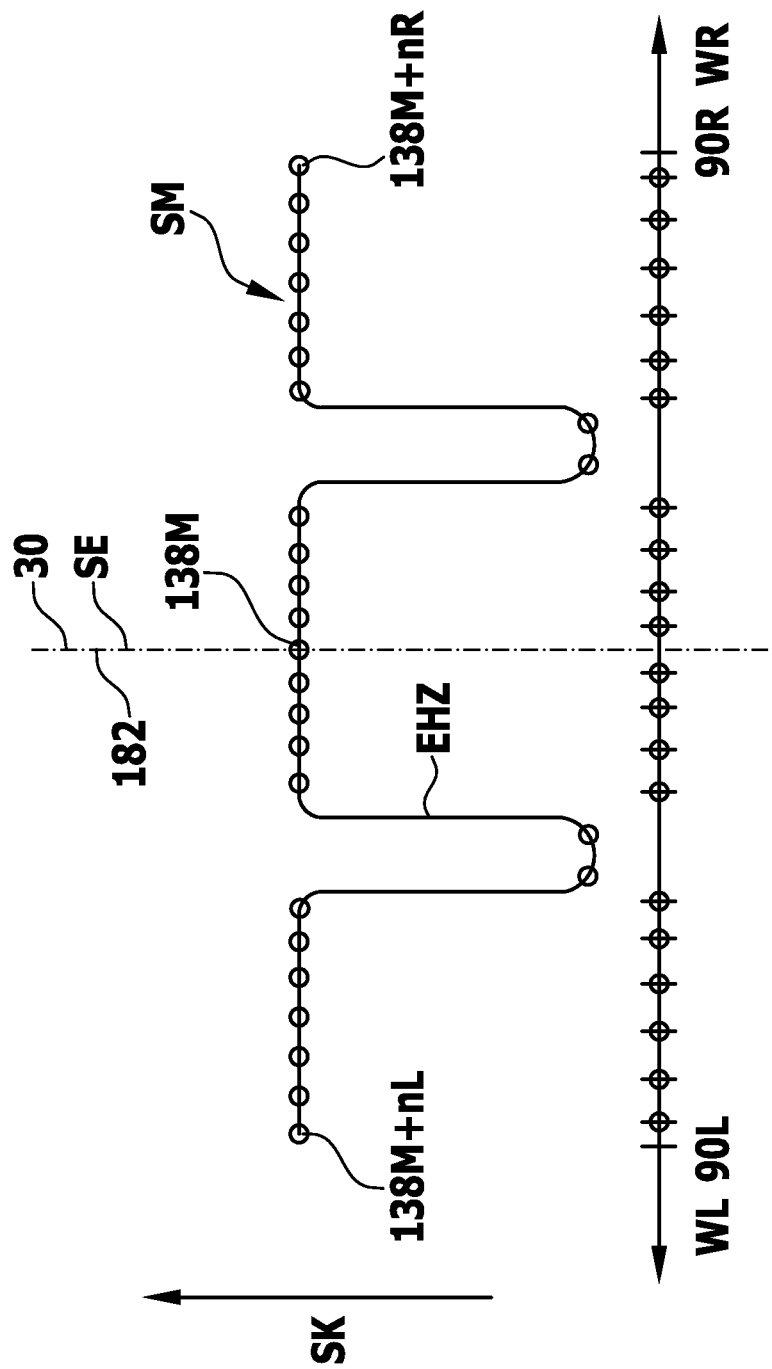
FIG. 13 shows an illustration similar to FIG. 10 of the pattern of signal values based on the detection location plotted over the detection locations in the case of the coupling head according to FIG. 12.
Figure 14:
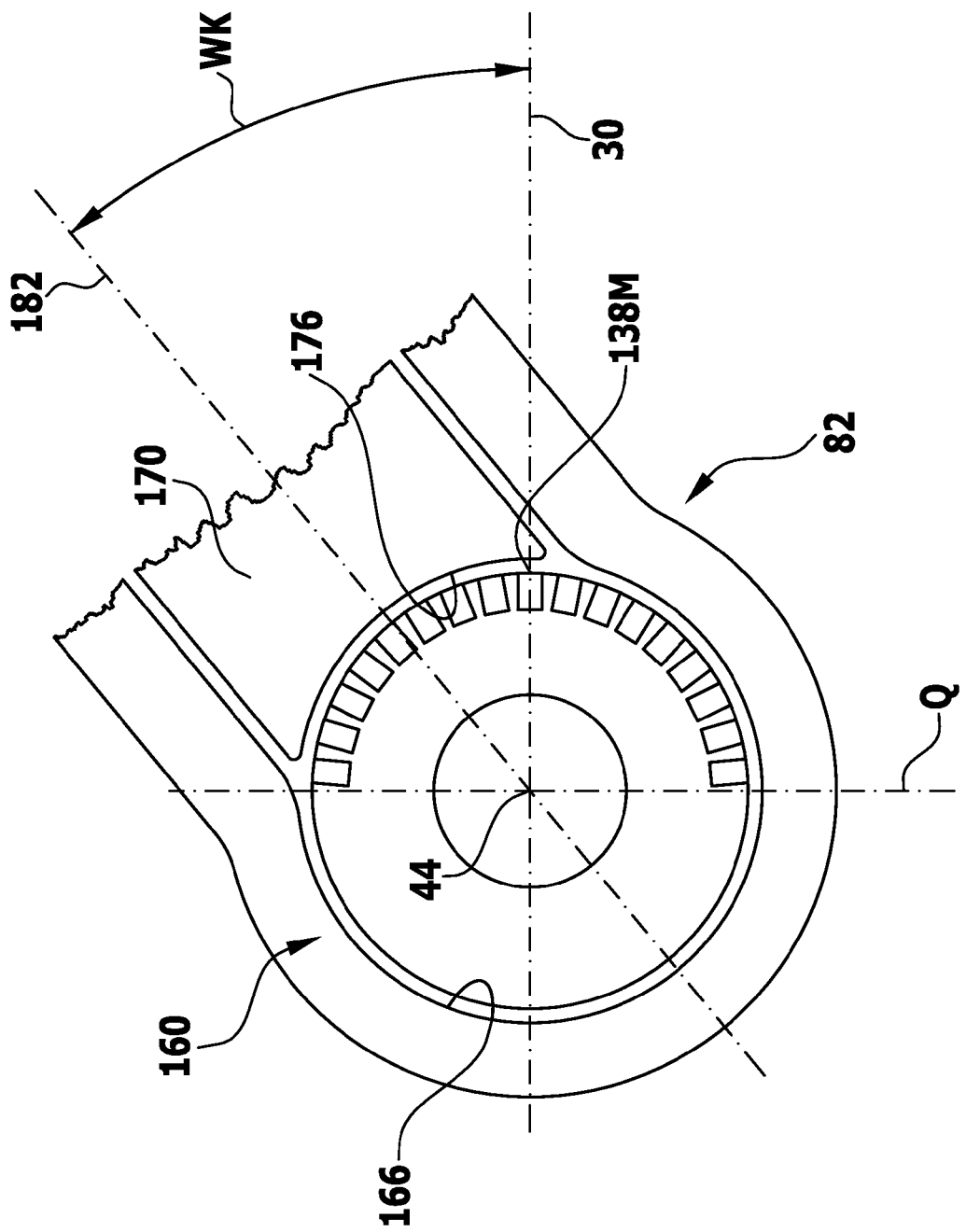
FIG. 14 shows an illustration similar to FIG. 12 of the coupling head relative to the coupling ball during cornering.

If an envelope EHZ is set as a result of these measured signal values SK, this is symmetrical to the longitudinal central plane 30 during travel straight ahead, as illustrated in FIG. 13, wherein the plane of symmetry SE coincides with the longitudinal central plane 30.

The envelope EHZ may be determined, for example, from specific functions by way of adjustment of their parameters such that the deviation of the envelope EHZ as calculated from the signal values SK ascertained is minimal.

In addition, it may be determined, in particular, by way of appropriate specification of the functions that the envelope EHZ is intended to be symmetrical to a plane of symmetry SE, wherein the plane of symmetry SE of the envelope EHZ coincides with the longitudinal central plane 30 during travel straight ahead.

Figure 15:
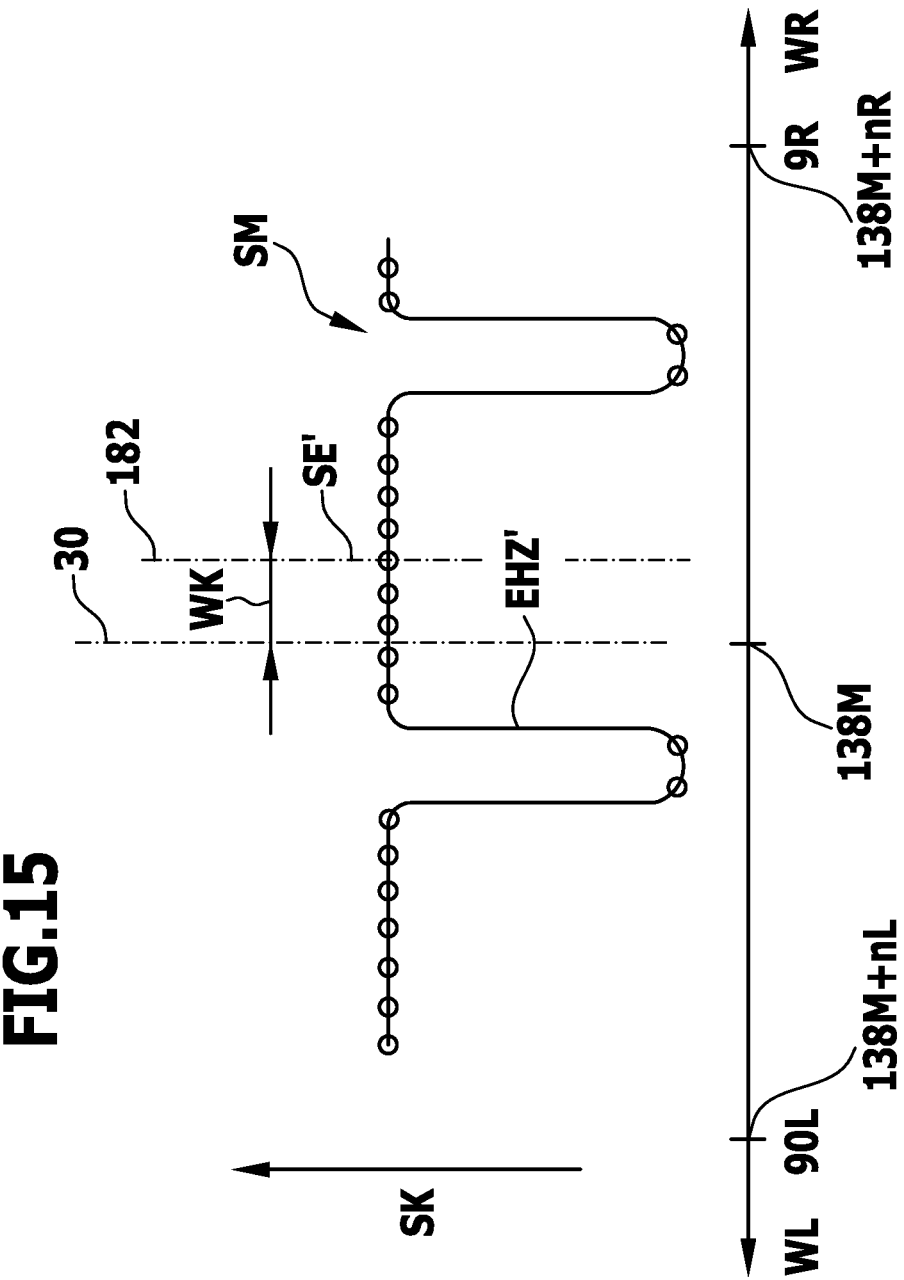
FIG. 15 shows an illustration of the pattern based on the detection location during cornering in accordance with FIG. 14.

If, however, cornering occurs, the coupling head 82 is arranged with its longitudinal central plane 182 turned about the central axis 44 relative to the longitudinal central plane 30 and so signals will also be measured at the detection locations 138 which, as illustrated in FIG. 15, lead to an envelope EHZ′ which is shifted to one side, for example to the right-hand side, in relation to the position of the longitudinal central plane 30, defined by the detection location 138M.

As a result of the shifting of the envelope EHZ′ relative to the longitudinal central plane 30 and the ascertainment of the plane of symmetry SE which belongs to the envelope EHZ′ and corresponds to the position of the longitudinal central plane 182, the turning of the coupling head 82 with the longitudinal central plane 182 relative to the longitudinal central plane 30 may be determined from the difference in the angle between the position of the longitudinal central plane 30 and the position of the plane of symmetry SE, wherein, in this respect, the evaluation unit 150 is in a position to ascertain the angle WK between the longitudinal central plane 182 and the longitudinal central plane 30 of the vehicle body 12 immediately, namely without any calibrating procedure or any learning procedure being necessary since the detection locations 138 are all arranged stationarily relative to the ball body 100 and, therefore, also stationarily relative to the longitudinal central plane 30.

As a result, it is possible to ascertain the angle WK between the coupling head 82 and the longitudinal central plane 30 of the trailer coupling 20 absolutely by means of the evaluation unit 150.

Such an angle WK ascertained absolutely by the evaluation unit 150 can be used for the most varied of vehicle functions.

For example, it is possible to convey the information concerning the angle between the longitudinal central plane 30 of the vehicle body 12 and the longitudinal central plane 182 of the coupling head 82 to a unit 192 for detecting travel dynamics which can detect swerving movements, for example, from the angle WK and, for example, a temporary change in the angle WK and can trigger corresponding reactions in the vehicle.

It is, however, also possible for the evaluation unit 150 to convey the information concerning the angle WK between the longitudinal central plane 30 of the trailer coupling 20 and the longitudinal central plane 182 of the coupling head 82 to a reversing control 194 which is in a position, for example in conjunction with an electronic steering, to control any reversing of the vehicle 10 with the trailer 80, wherein the driver of the vehicle can be relieved of complex steering movements, in particular in the case of single axle trailers 80.

It is, however, also possible to couple the evaluation unit 150 to a visualization unit 196 which is in a position to visualize the angular position of the trailer 80 relative to the motor vehicle body 12 and/or to determine and, where applicable, to visualize the length of a trailer.

In addition, it is also possible to couple the evaluation unit 150 to a safety unit 198 which is, therefore, in a position to detect, apart from the most varied of angular positions of the coupling head 82 relative to the longitudinal central plane 30, the constant presence and the engagement of the coupling head 82 on the coupling ball 100 by comparing the pattern of signal values SM or envelope respectively detected with patterns of signal values stored as a reference or reference envelopes since, during this engagement of the coupling head 82 on the coupling ball 100, a characteristic pattern of signal values SM or a characteristic envelope EHZ can be ascertained which deviates significantly, for example, from the envelope EHL used or the envelope EHZ in the case of the non-existence of a body K engaging on the ball body 100.

The safety unit 198 can, therefore, check the presence of the body K, for example the coupling 72 of the load carrier 70, or the presence of the coupling head 82 of the trailer 80 not only during travel but also alternatively or in addition, for example, when the vehicle is standing still and, therefore, this can be used as an anti-theft alarm.

No specific embodiments for the design of the sensor units have been explained in conjunction with the preceding description of the solution according to the invention.

Figure 16:
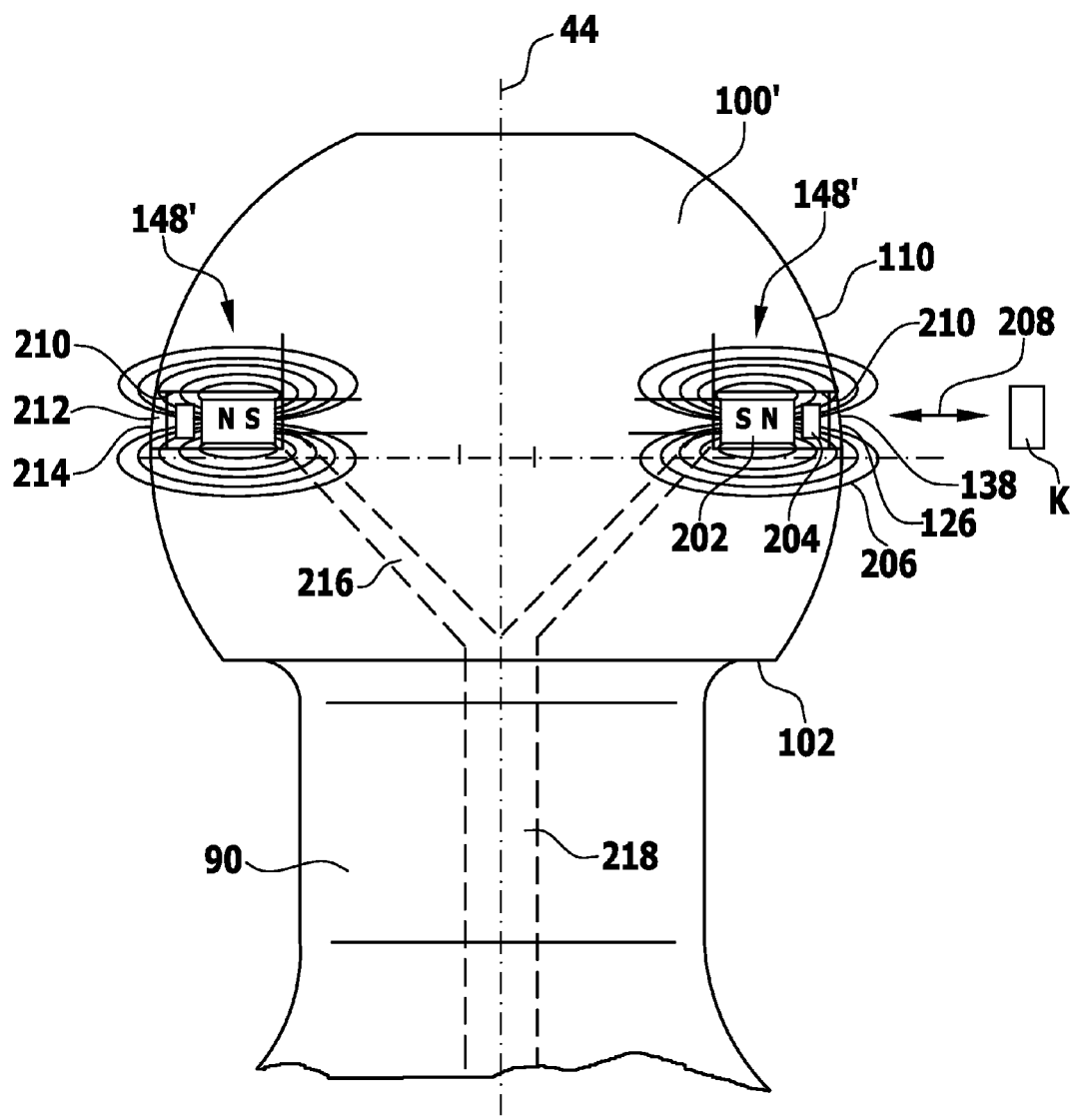
FIG. 16 shows an illustration of a second embodiment with sensor units according to the invention integrated in a ball body of a coupling ball according to FIGS. 6 and 7.

A second embodiment of sensor units 148' according to the invention, as illustrated in FIG. 16, comprises, for example, for each sensor unit 148' a permanent magnet 202 which is arranged with its north and south poles N, S such that they are arranged so as to follow one another in a radial direction relative to the central axis 44.

If the north pole N is located, for example, radially outwards in relation to the south pole S, as illustrated in FIG. 16, a magnetic field sensor 204, preferably a Hall sensor which has at least some of the field lines 206 of the magnetic field leading away from the north pole N passing through it, is arranged directly in front of the north pole N.

This arrangement of permanent magnet 202 and magnetic field sensor 204 has, therefore, a direction of detection 208 which is aligned radially to the central axis 44 and so any approach of a metallic, magnetizable body K in the direction of detection 208 will lead to a change in the course of the magnetic field lines 206 and, therefore, to a change in the magnetic flux through the magnetic field sensor 204.

This change in the magnetic flux through the magnetic field sensor 204 leads to a signal value SK detected by the evaluation unit. In the case of the first embodiment of the sensor unit 148' illustrated in FIG. 16, the permanent magnet 202 belonging to this sensor unit 148' is seated with the magnetic field sensor 204 in a recess 210 in the ball body 100 which is provided in the ball surface 110 in the region of the sensor zone 126, wherein a protective covering 212 is also provided between the magnetic field sensor 204 and the ball surface 110 in the region of the sensor zone 126 and this covering preferably consists of a non-magnetizable material and closes the recess 210, wherein an outer surface of the protective covering 212 is adapted to the ball surface 110 and complements the ball body 100 in the region of the recess 210 to the extent that the ball surface 110 has no interruption or inhomogeneity in the region of the recess 210.

In the second embodiment illustrated in FIG. 16, a recess is provided in the ball body 100 for each sensor unit 148' at each detection location 138 and this recess is designed, for example, as a bore which is radial to the central axis 44 and penetrates the ball body 100 from the ball surface 110.

In the second embodiment of sensor units 148' according to the invention, an angled bore 216, which extends in the direction of the lower end surface 102 and at an acute angle relative to the central axis 44, is provided for the electrical connection of the respective sensor unit 148' to the evaluation unit proceeding from each recess 210, wherein all the angled bores 216 open from all the recesses 210 into a central channel 218 which passes through the ball attachment 90 coaxially to the central axis 44 and reaches as far as the angled bores 216.

Alternatively to the angled bores 216, it is, however, also conceivable to provide a bore which extends from the respective recess 210 essentially radially to the central axis 44 and likewise opens into the central channel 218, wherein the central channel 218 passes not only through the ball attachment 90 but also reaches into the ball body 100.

Figure 17:
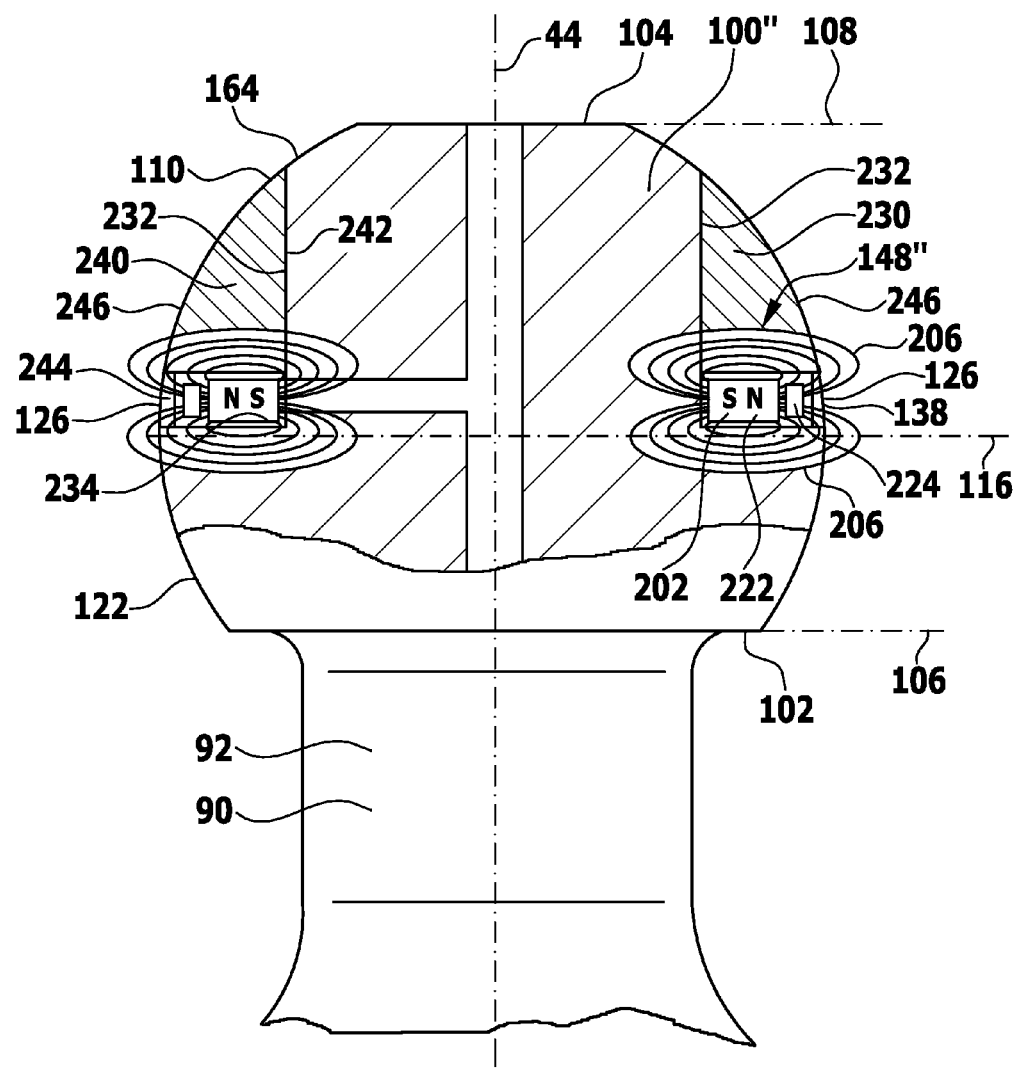
FIG. 17 shows an illustration of a third embodiment with sensor units similar to FIG. 16 in a variation of a ball body of the coupling ball.

In a third embodiment with a plurality of sensor units 148" according to the invention, illustrated in FIG. 17, an individual permanent magnet 202 is not provided for every sensor unit 148" but rather a ring 222 of permanent magnets which extends around the central axis 44 is provided, wherein the ring 222 has a north pole N located, for example, radially outwards and a south pole S located, for example, radially inwards in relation to the central axis 44.

The respective magnetic field sensor 224 is provided on the ring 222 at the respective detection location 138 so as to be located radially outwards in relation to the central axis 44, wherein the magnetic field sensors 224 are likewise preferably Hall sensors.

The magnetic field sensors 224 can be fixed in position, for example, on the ring 222.

In order to be able to mount the ring 222 on the ball body 100", the ball body 100" is preferably provided with a recess 230 which is designed to extend all the way around the central axis 44 and, for example, has an inner wall 232 which extends cylindrically to the central axis 44 as well as a base 234 which is designed to extend as a circular ring surface around the central axis 44 at right angles thereto.

As a result, the recess 230 forms a step-like recess extending around the central axis 44 and is located, for example, in the region of the sensor zone 126 so that the ball body 100 itself still has the supporting zone 164 and the lower ball zone 122 of the ball surface 110.

The recess 230 is closed by an annular body 240 which is supported, for example, on the inner wall with an inner surface 242 and forms a protective ring 244 which is located in the region of the sensor zone 126 between the magnetic field sensors 224 and the ball surface 110.

The annular body 240 is supported, for example, on the base 234 of the recess 230 with the protective ring 244.

Furthermore, the annular body 240 has, for its part, a recess which allows the ring 222 of permanent magnets and the magnetic field sensors 224, which are arranged, for example, over the base 234 of the recess 230, to be accommodated.

Furthermore, the ring 240 forms an outer surface 246 which complements the ball body 100″ in the region of the recess 230 in such a manner that the ball surface 110 extends continuously and uninterruptedly from the lower end surface 102 as far as the upper end surface 104.

The annular body 240 is, for example, a body consisting of a non-magnetizable material, for example aluminum, which has sufficient strength on its outer surface 246 in the region of the ball surface 110 but, on the other hand, does not influence the magnetic field lines 206.

As for the rest, all those element of the third embodiment which are provided with the same reference numerals are identical to those of the first embodiment and so with respect to their description reference can be made in full to the comments on them in conjunction with the first embodiment.

Figure 18:
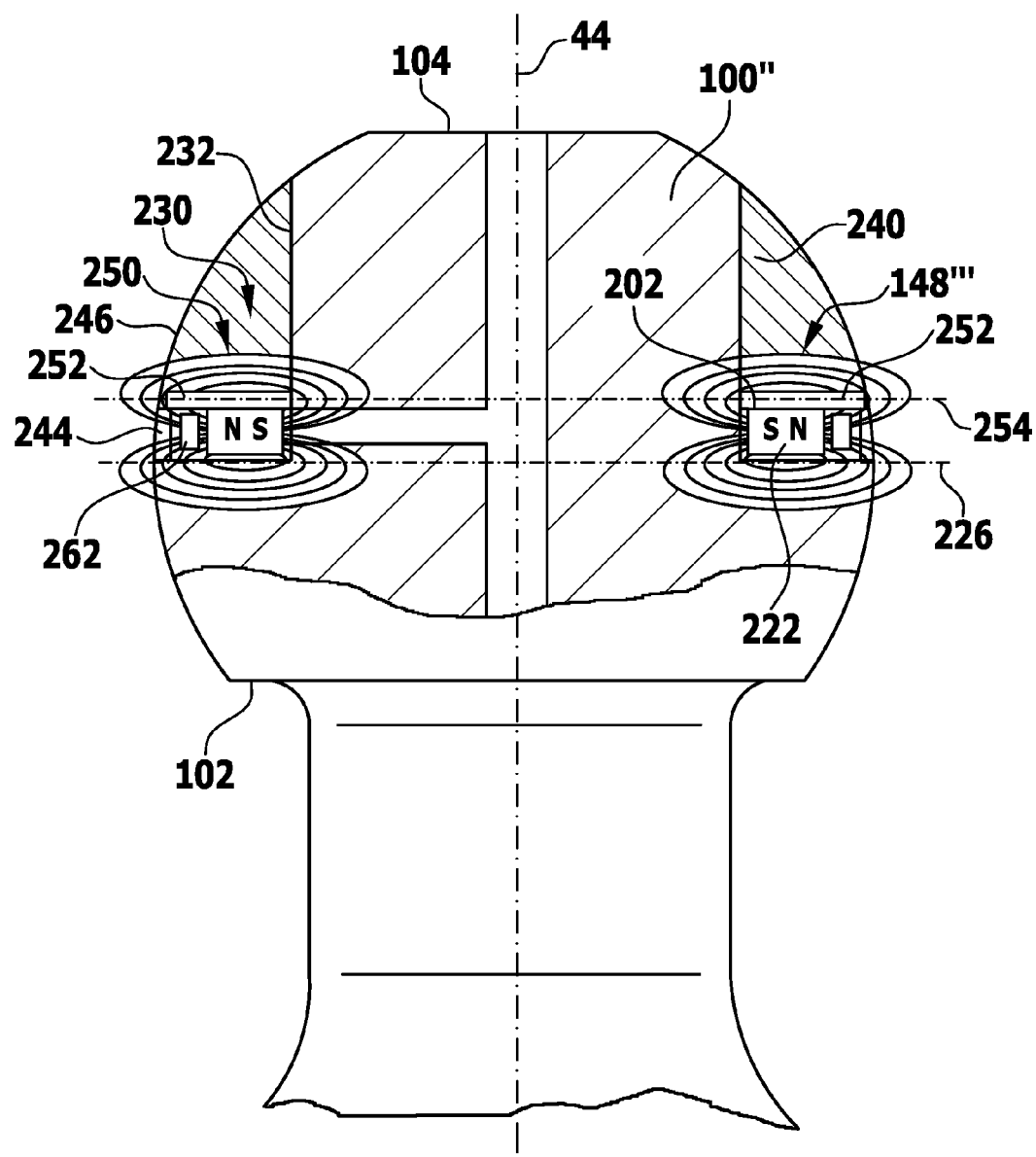
FIG. 18 shows an illustration similar to FIG. 16 of a fourth embodiment with sensor units according to the invention.
Figure 19:
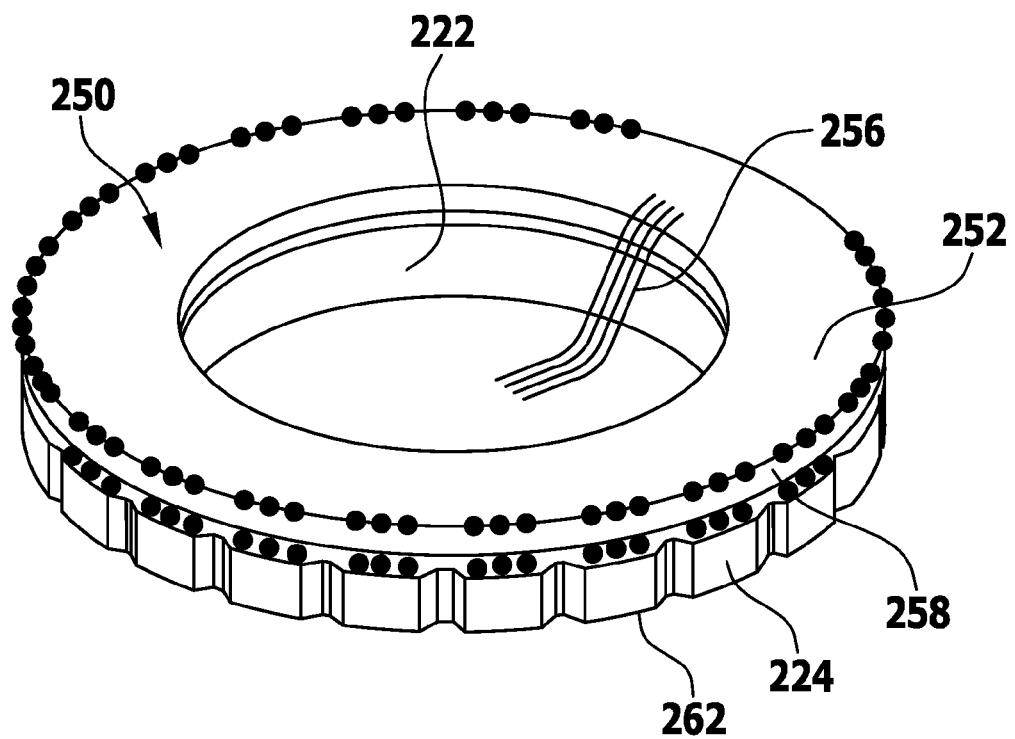
FIG. 19 shows an enlarged illustration of an array of sensors according to the invention.

In a fourth embodiment, illustrated in FIGS. 18 and 19, the individual sensor units 148′″ are combined to form an array of sensors 250 which comprises the individual sensor units 148″.

For example, a carrier circuit board 252 is provided in the case of this array of sensors 250 and this is arranged in the recess 230 such that it extends in a ring shape relative to the central axis 44 and, for example, extends in a plane 254 which runs at right angles to the central axis 44.

This carrier circuit board 252 acts, in addition, as a printed circuit board and supports the individual magnetic field sensors 224, wherein the individual magnetic field sensors are also connected electrically to the carrier circuit board 252 so that the individual magnetic field sensors 242 are in contact via the carrier circuit board 252 and an electric line 256 can then lead to the evaluation unit 150 proceeding from the carrier circuit board.

The magnetic field sensors 224 are seated, for example, close to an outer edge 258 of the carrier circuit board and form a circumferential circle of sensors 262 which projects from the carrier circuit board 252 and surrounds the ring 222 with the permanent magnets 202 radially outwards in relation to the central axis 44.

As a result, it is possible to connect the ring 222 with the permanent magnets 202 and, subsequently, the carrier circuit board 252 and the circle of sensors 262 to one another, for example to cast them, prior to any mounting thereof in the recess 230 or to place the ring 222 and the array of sensors 250 with the circle of sensors 262 surrounding the ring 222 radially outwards in the recess 230 of the ball body 100″ and then place the annular body 240 on top for the purpose of closing the recess 230.

In both cases, the array of sensor 250 with the carrier circuit board 252 lies on the ring 222 while the circle of sensors 262 surrounds the ring 222 radially outwards and so the array of sensors 250 and the ring 222 form a compact unit.

In this respect, the annular body 240 is designed such that it complements the ball body 100″ with its outer surface 246 such that a continuous ball surface 110 is present between the lower end surface 102 and the upper end surface 104 and, in addition, the protective ring 244 covers the circle of sensors 262.

Figure 20:
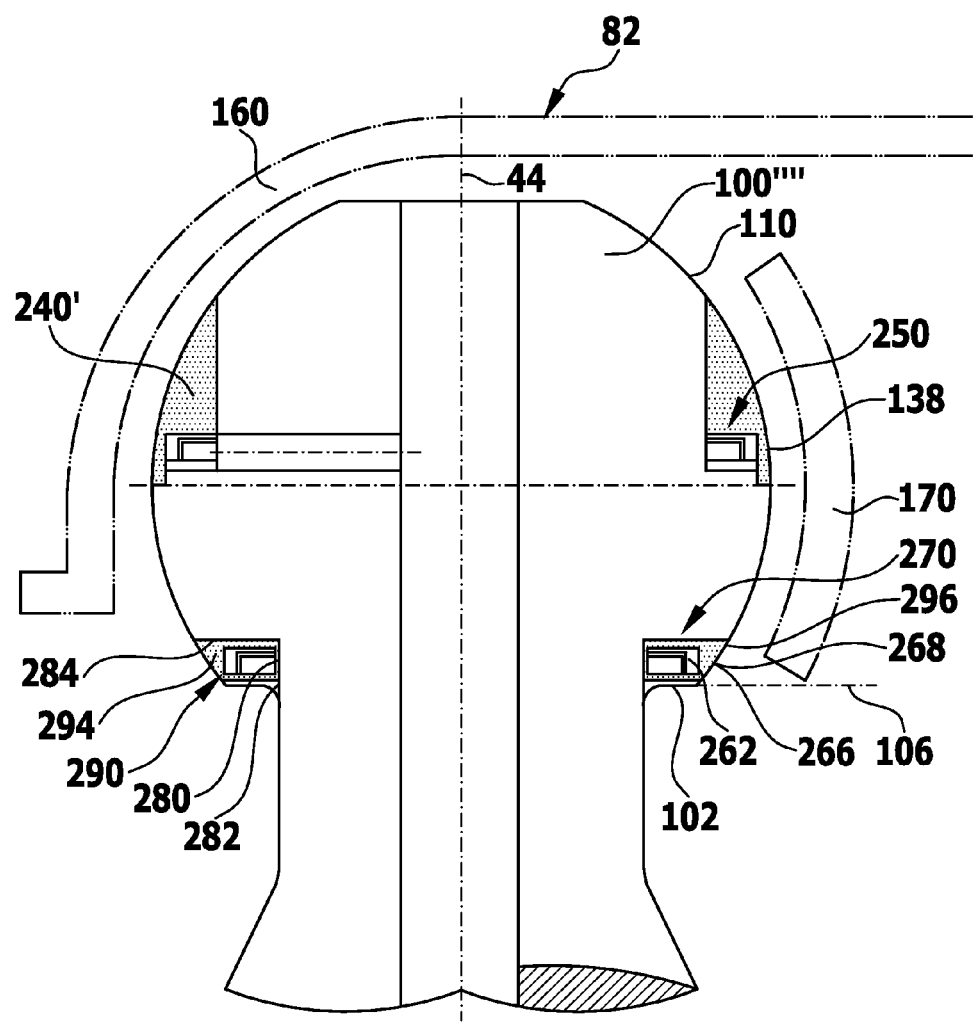

In a fifth embodiment, illustrated in FIG. 20, the same array of sensors 250 is arranged in the ball body 100″″ as in the fourth embodiment and, in addition, the annular body 240 is also designed in the same way as in the fourth embodiment.

An exact analysis of the envelopes EHZ, as detected by the array of sensors 250, shows that the envelopes EHZ are dependent on tilting about the longitudinal axis L or the transverse axis Q (illustrated in FIG. 5).

For example, such a tilting results in the envelope EHZ″ and another type of such tilting in the envelope EHZ‴, as illustrated in FIG. 21, although the angle between the longitudinal central plane 182 and the longitudinal central plane 30 of the trailer coupling 20 is the same.

In order, therefore, to be able to detect any tilting of the coupling head 82 about the longitudinal axis L and the transverse axis Q, the ball body 100″″, as illustrated in FIG. 20, is preferably provided with a second sensor zone 266, in which detection locations 268 are likewise located which are arranged around the central axis 44 in the same way as the detection locations 138.

The second sensor zone 266 joins directly onto the lower end surface 102 of the ball body 100″″.

In order to be able to detect the titling of the coupling head 82 about the longitudinal axis L and the transverse axis Q exactly, an array of sensors 270 is provided which, with respect to its construction and its mode of operation as well as its interaction with the evaluation unit 150, functions in the same way as the array of sensors 250 and so, in this respect, reference can be made in full to the array of sensors 250.

The array of sensors 270 is seated in a recess 280 which extends into the ball body 104′ proceeding from the lower end surface 102 and has an inner wall 282 and a base 284.

In this respect, the recess 280 extends into the ball body 100″″ proceeding from the second end surface 102.

The base 284 preferably extends parallel to the lower plane 106 and, therefore, at right angles to the central axis 44 whereas the inner wall 282 extends cylindrically around the central axis 44.

The array of sensors 270 is seated, for its part, in an annular body 290 which forms, on the one hand, the lower end surface 102 and, on the other hand, complements the ball surface 110 of the ball body 104′ in the region of the recess 280 as far as the lower end surface 102 so that, as a result, the ball body 104′ has the same ball surface 110 as the preceding embodiments.

Furthermore, the annular body 290 comprises a protective ring 294 which surrounds the array of sensors 270 on its radially extending outer side in the region of the circle of sensors 262 and so the magnetic field sensors 202 of the circle of sensors 262 are protected by this protective ring 294, wherein the annular body 290 has an outer surface 296 which complements the ball surface 110 exactly as far as the lower end surface 102.

As a result of the signals from the array of sensors 270 it is possible to determine a measure for the tilting of the coupling head 82 about the longitudinal axis L and/or the transverse axis Q which facilitates a correction of the envelope EHZ, illustrated in FIG. 21, with respect to the tilting.

In addition, the array of sensors 270 also supplies signal values which facilitate an improved identification of the body K engaging on the ball body 100, for example an improved identification of the coupling head 82 in comparison with the coupling 72.

The invention claimed is:

1. Trailer coupling for motor vehicles, comprising a coupling ball carrier mountable on a vehicle body and a coupling ball with a ball body having a ball surface extending between a ball attachment and an upper end surface of the ball body, the ball surface comprising a sensor zone, several stationary detection locations different from one another being located in said sensor zone, a sensor unit arranged stationarily in the ball body beneath the ball surface being associated with each detection location and each sensor unit being designed such that it detects a body present in a close-proximity area above the ball surface at the respective detection location;
- wherein the sensor units are designed as sensor units detecting a magnetizable body;
- wherein the sensor units are designed as sensor units detecting a change in a course of a magnetic field caused by the body; and
- wherein the sensor units have a magnet generating the magnetic field as well as a magnetic field sensor.

2. Trailer coupling as defined in claim 1, wherein the sensor zone is located between a lower boundary plane and an upper boundary plane extending parallel to the equatorial plane.

3. Trailer coupling as defined in claim 2, wherein the upper boundary plane of the sensor zone is at a distance from the equatorial plane corresponding at the most to half the radius of the ball surface.

4. Trailer coupling as defined in claim 2, wherein the lower boundary plane of the sensor zone is at a distance from the equatorial plane corresponding to at least one twentieth of a radius of the ball surface.

5. Trailer coupling as defined in claim 1, wherein the sensor zone is located at least in a rearward surface area of the ball surface.

6. Trailer coupling as defined in claim 1, wherein the sensor zone extends around a central axis of the coupling ball at least over part of the circumference of the ball surface;
- wherein the sensor zone stretches from the rearward surface area of the ball surface in opposite circumferential directions around the central axis at least over part of the circumference of the ball surface; and
- wherein the sensor zone extends at least as far as a transverse plane of the coupling ball extending through the central axis.

7. Trailer coupling as defined in claim 1, wherein the sensor zone is located on a side of the equatorial plane facing away from the ball attachment.

8. Trailer coupling as defined in claim 1, wherein at the respective detection location each of the sensor units detects a distance of the body from the ball surface in the close-proximity area above the ball surface.

9. Trailer coupling as defined in claim 1, wherein the sensor units are sensor units operating without contact.

10. Trailer coupling as defined in claim 9, wherein the sensor units are designed as sensor units detecting metallic bodies.

11. Trailer coupling as defined in claim 1, wherein at the detection location the sensor units have a direction of detection with a component extending radially to the central axis of the coupling ball; and
- wherein the detection locations are arranged so as to follow one another in a circumferential direction extending around the central axis of the coupling ball.

12. Trailer coupling as defined in claim 1, wherein the detection locations are located in a plane of detection extending transversely to the central axis of the coupling ball.

13. Trailer coupling as defined in claim 1, wherein the ball body of the coupling ball is provided with at least one recess for accommodating at least one of the sensor units; and
- wherein the recess is designed to extend at least over part of the circumference of the ball body.

14. Trailer coupling as defined in claim 13, wherein a supplementary ball body is insertable into the recess, said body having an outer surface supplementing the ball surface in the region of the recess;
- wherein the recess is a recess extending in the ball body in a stepped manner; and
- wherein the supplementary ball body and the recess together form a free space for accommodating the sensor units.

15. Trailer coupling as defined in claim 1, wherein all the magnetic field sensors are combined to form an array of sensors forming a coherent part.

16. Trailer coupling as defined in claim 15, wherein the array of sensors forms a circle of sensors surrounding permanent magnets externally and radially in relation to the central axis.

17. Trailer coupling as defined in claim 16, wherein the array of sensors has a ring consisting of permanent magnets.

18. Trailer coupling as defined in claim 1, wherein the body detectable by the sensor units is formed by a coupling of a load carrier.

19. Trailer coupling as defined in claim 1, wherein the body detectable by the sensor units is formed by a coupling head of a trailer.

20. Trailer coupling as defined in claim 1, wherein the sensor units are coupled to an evaluation unit detecting and evaluating the sum total of the signal values generated by the sensor units.

21. Trailer coupling as defined in claim 20, wherein the evaluation unit evaluates the signal values detected at the respective detection locations in terms of the detection location.

22. Trailer coupling as defined in claim 21, wherein the evaluation unit compiles from the signal values a pattern of signal values of the respective body based on the detection location.

23. Trailer coupling as defined in claim 22, wherein the pattern of signal values for the body, based on the detection location is symmetrical to a plane of symmetry of the body, and to the coupling or the coupling head.

24. Trailer coupling for motor vehicles, comprising a coupling ball carrier mountable on a vehicle body and a coupling ball with a ball body having a ball surface extending between a ball attachment and an upper end surface of the ball body, the ball surface comprising a sensor zone, several stationary detection locations different from one another being located in said sensor zone, a sensor unit arranged stationarily in the ball body beneath the ball surface being associated with each detection location and each sensor unit being designed such that it detects a body present in a close-proximity area above the ball surface at the respective detection location;
- wherein the sensor units are coupled to an evaluation unit detecting and evaluating the sum total of the signal values generated by the sensor units;
- wherein the evaluation unit evaluates the signal values detected at the respective detection locations in terms of the detection location;
- wherein the evaluation unit compiles from the signal values a pattern of signal values of the respective body based on the detection location;
- wherein the evaluation unit approximates the pattern of signal values based on the detection location by means of an envelope, the values thereof being a function of the detection locations.

25. Trailer coupling as defined in claim 24, wherein the envelope is ascertained by way of parameter adjustment of functions predetermined for the envelope.

26. Trailer coupling as defined in claim 24, wherein the evaluation unit ascertains the plane of symmetry for the respective pattern of signal values or for the respective envelope.

27. Trailer coupling as defined in claim 26, wherein the evaluation unit ascertains an angle between the plane of symmetry of the body and a longitudinal central plane of the trailer coupling on the basis of the position of the plane of symmetry relative to the longitudinal central plane.

28. The trailer coupling of claim 24, wherein the sensor units are sensor units operating without contact.

29. Trailer coupling as defined in claim 28, wherein the sensor units operate ultrasonically.

* * * * *